(12) United States Patent
Kasaba

(10) Patent No.: US 11,582,424 B1
(45) Date of Patent: Feb. 14, 2023

(54) SYSTEM AND METHOD FOR AN INTERACTIVE DIGITALLY RENDERED AVATAR OF A SUBJECT PERSON

(71) Applicant: KNOW SYSTEMS CORP, Middletown, DE (US)

(72) Inventor: Michael E. Kasaba, Malibu, CA (US)

(73) Assignee: KNOW SYSTEMS CORP., Middletown, DE (US)

(*) Notice: Subject to any disclaimer, the term of this patent is extended or adjusted under 35 U.S.C. 154(b) by 0 days.

(21) Appl. No.: 17/709,997

(22) Filed: Mar. 31, 2022

Related U.S. Application Data

(63) Continuation-in-part of application No. 17/410,620, filed on Aug. 24, 2021, now Pat. No. 11,323,663,
(Continued)

(51) Int. Cl.

| | |
|---|---|
| H04N 7/15 | (2006.01) |
| G09B 5/14 | (2006.01) |
| G06N 20/00 | (2019.01) |
| G06F 3/01 | (2006.01) |
| G06V 40/20 | (2022.01) |
| G06V 40/16 | (2022.01) |

(52) U.S. Cl.
CPC ............ *H04N 7/157* (2013.01); *G06F 3/017* (2013.01); *G06N 20/00* (2019.01); *G06V 40/174* (2022.01); *G06V 40/28* (2022.01); *G09B 5/14* (2013.01)

(58) Field of Classification Search
CPC ............ H04N 7/142; H04N 7/14; H04N 7/15; H04N 7/157; H04N 5/23203; H04N 5/265
USPC ............................................. 348/14.02–14.9
See application file for complete search history.

(56) References Cited

U.S. PATENT DOCUMENTS

| | | | |
|---|---|---|---|
| 7,139,767 B1 | 11/2006 | Taylor et al. | |
| 8,285,549 B2 | 10/2012 | Teegan et al. | |
| (Continued) | | | |

FOREIGN PATENT DOCUMENTS

| | | |
|---|---|---|
| EP | 2849087 A1 | 3/2015 |
| KR | 10-2018-0093455 A | 8/2018 |
| (Continued) | | |

OTHER PUBLICATIONS

International Search Report and Written Opinion dated Mar. 7, 2022 for International application No. PCT/US2021/058423.

*Primary Examiner* — Maria El-Zoobi
(74) *Attorney, Agent, or Firm* — Plumsea Law Group, LLC

(57) ABSTRACT

A system and method for an interactive digitally rendered avatar of a subject person to participate in a web meeting is described. In one embodiment, the method includes receiving an invite to a web meeting on a video conferencing platform, wherein the invite identifies a subject person and the video conferencing platform. The method also includes generating an interactive avatar of the subject person based on a data collection associated with the subject person stored in a database. The method further includes instantiating a platform integrator associated with the video conferencing platform identified in the invite and joining, by the interactive avatar of the subject person, the web meeting on the video conferencing platform. The platform integrator transforms outputs and inputs between the video conferencing platform and an interactive digitally rendered avatar system so that the interactive avatar of the subject person participates in the web meeting.

13 Claims, 29 Drawing Sheets

Related U.S. Application Data which is a continuation of application No. 17/094,146, filed on Nov. 10, 2020, now Pat. No. 11,140,360.

(56) References Cited

U.S. PATENT DOCUMENTS

| | | |
|---|---|---|
| 9,058,698 B2 | 6/2015 | Jones et al. |
| 9,318,113 B2 | 4/2016 | Westby et al. |
| 9,357,174 B2 | 5/2016 | Li et al. |
| 9,608,950 B2 | 3/2017 | Geiger et al. |
| 9,613,450 B2 | 4/2017 | Wang et al. |
| 9,716,674 B2 | 7/2017 | Ciofalo et al. |
| 9,959,368 B2 | 5/2018 | Kolluru et al. |
| 9,965,553 B2 | 5/2018 | Lyren |
| 9,996,963 B2 | 6/2018 | Ray et al. |
| 10,139,917 B1 | 11/2018 | Nariyawala et al. |
| 10,169,897 B1 | 1/2019 | Geiger et al. |
| 10,275,121 B1 | 4/2019 | Geiger et al. |
| 10,291,669 B2 | 5/2019 | Dharmaji |
| 10,313,403 B2 | 6/2019 | Ciofalo et al. |
| 10,362,219 B2 | 7/2019 | Wilson et al. |
| 10,523,898 B1 | 12/2019 | Ward |
| 10,628,635 B1 | 4/2020 | Carpenter, II et al. |
| 10,679,626 B2 | 6/2020 | Aarabi |
| 10,706,347 B2 | 7/2020 | Garcia |
| 10,853,717 B2 | 12/2020 | Abramson et al. |
| 11,140,360 B1 | 10/2021 | Kasaba |
| 11,303,851 B1 | 4/2022 | Kasaba |
| 11,317,061 B1 | 4/2022 | Kasaba |
| 11,323,663 B1 | 5/2022 | Kasaba |
| 2002/0010584 A1 | 1/2002 | Schultz et al. |
| 2007/0165022 A1 | 7/2007 | Peleg et al. |
| 2009/0112680 A1 | 4/2009 | Dovrath et al. |
| 2010/0156781 A1 | 6/2010 | Fahn |
| 2011/0007079 A1 | 1/2011 | Perez et al. |
| 2011/0225498 A1 | 9/2011 | Goldman et al. |
| 2013/0257876 A1 | 10/2013 | Davis |
| 2013/0257877 A1 | 10/2013 | Davis |
| 2013/0258040 A1 | 10/2013 | Kaytaz et al. |
| 2015/0121215 A1 | 4/2015 | Wohlert et al. |
| 2015/0213604 A1* | 7/2015 | Li .................. G06T 13/80 345/473 |
| 2016/0134840 A1* | 5/2016 | McCulloch .......... G06V 40/165 348/14.03 |
| 2016/0361653 A1* | 12/2016 | Zhang .................. A63F 13/655 |
| 2017/0018200 A1 | 1/2017 | Nemire et al. |
| 2017/0206795 A1 | 7/2017 | Kaleal, III |
| 2017/0206797 A1 | 7/2017 | Solomon et al. |
| 2018/0061254 A1 | 3/2018 | Amigud |
| 2018/0350144 A1 | 12/2018 | Rathod |
| 2018/0359293 A1 | 12/2018 | Faulkner et al. |
| 2019/0051032 A1 | 2/2019 | Chu et al. |
| 2019/0266774 A1 | 8/2019 | Sommerlade et al. |
| 2019/0333094 A1 | 10/2019 | Newell et al. |
| 2020/0306640 A1 | 10/2020 | Kolen et al. |
| 2020/0314483 A1* | 10/2020 | Rakshit .............. H04N 21/4318 |
| 2021/0019982 A1 | 1/2021 | Todd |
| 2021/0295579 A1 | 9/2021 | Davis |
| 2022/0028412 A1* | 1/2022 | Aher .................. G10L 15/1822 |

FOREIGN PATENT DOCUMENTS

| | | |
|---|---|---|
| KR | 10-1925440 B1 | 12/2018 |
| KR | 102035596 B1 | 10/2019 |
| WO | 2019036569 A1 | 2/2019 |

* cited by examiner

SYSTEM AND METHOD FOR AN INTERACTIVE DIGITALLY RENDERED AVATAR OF A SUBJECT PERSON

CROSS-REFERENCE TO RELATED APPLICATION

This application is a continuation-in-part of and claims benefit to U.S. patent application Ser. No. 17/410,620, filed on Aug. 24, 2021 and titled "System and Method for an Interactive Digitally Rendered Avatar of a Subject Person", which application is a continuation of and claims benefit to U.S. patent application Ser. No. 17/094,146, filed on Nov. 10, 2020 and titled "System and Method for an Interactive Digitally Rendered Avatar of a Subject Person", the disclosures of which applications are incorporated by reference herein in their entirety.

BACKGROUND

The present disclosure generally relates to using an artificial intelligence system to digitally render an avatar of a subject person, and in particular, to using a digitally rendered avatar of a subject person to interact with one or more users.

Technology and social media has greatly expanded the ability of people to engage and interact with other people from all over the world through text, audio, and video. However, this expanded audience also causes issues with being able to engage in one-on-one conversations or interactions with people who are particularly popular. For example, celebrities and other notable persons (such as politicians, athletes, etc.) may have many millions of followers. It is not practical or feasible in these cases for the celebrity or notable person to be able to interact with so many people on an individualized basis.

There is a need in the art for a system and method that provides increased access that allows for more individual interactions between people.

SUMMARY OF THE INVENTION

A system and method for providing an interactive digitally rendered avatar of a subject person is described herein.

In one aspect, a method of providing an interactive digital avatar of a subject person during a video presentation is provided. The method includes transmitting a video presentation featuring a subject person to a plurality of users via a first communication format. The method also includes receiving from at least one user of the plurality of users during the video presentation, a request to initiate an interactive session with an avatar of the subject person. In response to the request, the method includes generating a first avatar of the subject person and initiating a first interactive session between the first avatar and the at least one user. The method further includes engaging in the first interactive session between the first avatar of the subject person and the at least one user via a second communication format that is different than the first communication format.

In another aspect, a system for providing an interactive digital avatar of a subject person during a video presentation is provided. The system includes a communication interface allowing communication with one or more users of a plurality of users. The system also includes an artificial intelligence engine in communication with the communication interface. The artificial intelligence engine including at least one processor, a memory, and storage for computer-readable instructions that, when executed by the at least one processer, cause the at least one processor to transmit, via the communication interface, a video presentation featuring a subject person to the plurality of users via a first communication format. The instructions also cause the processor to receive from at least one user of the plurality of users during the video presentation, a request to initiate an interactive session with an avatar of the subject person. In response to the request, the instructions cause the processor to generate a first avatar of the subject person and initiate a first interactive session between the first avatar and the at least one user. The instructions also cause the processor to engage in the first interactive session between the first avatar of the subject person and the at least one user via a second communication format that is different than the first communication format.

In another aspect, a method of providing an interactive digital avatar of a subject person is provided. The method includes transmitting a video featuring a subject person to a plurality of users via a first communication format. The method also includes receiving, from at least one user of the plurality of users, a request to initiate an interactive session with an avatar of the subject person. The method further includes engaging in the interactive session between the avatar of the subject person and the at least one user via a second communication format that is different than the first communication format.

In another aspect, a system for providing an interactive digital avatar of a subject person is provided. The system includes a communication interface allowing communication with one or more users of a plurality of users. The system also includes an artificial intelligence engine in communication with the communication interface, the artificial intelligence engine including at least one processor, a memory, and storage for computer-readable instructions that, when executed by the at least one processer, cause the at least one processor to: transmit, via the communication interface, a video featuring a subject person to the plurality of users via a first communication format; receive, from at least one user of the plurality of users, a request to initiate an interactive session with an avatar of the subject person; and engage in the interactive session between the avatar of the subject person and the at least one user via a second communication format that is different than the first communication format.

In still another aspect, a method of providing an interactive digital avatar of a subject person is provided. The method includes transmitting a video featuring at least one subject person to a plurality of users. The method also includes receiving, from a first user of the plurality of users, a request to initiate a first interactive session with a first avatar of a first subject person featured in the video. The method further includes engaging in the first interactive session between the first avatar of the first subject person and the first user. The method also includes receiving, from a second user of the plurality of users, a request to initiate a second interactive session with a second avatar of a second subject person featured in the video. The method includes engaging in the second interactive session between the second avatar of the second subject person and the second user. At least a portion of the first interactive session and the second interactive session occur concurrently.

Other systems, methods, features and advantages of the disclosure will be, or will become, apparent to one of ordinary skill in the art upon examination of the following figures and detailed description. It is intended that all such additional systems, methods, features and advantages be included within this description and this summary, be within the scope of the disclosure, and be protected by the following claims.

BRIEF DESCRIPTION OF THE DRAWINGS

The disclosure can be better understood with reference to the following drawings and description. The components in the figures are not necessarily to scale, emphasis instead being placed upon illustrating the principles of the disclosure. Moreover, in the figures, like reference numerals designate corresponding parts throughout the different views.

DETAILED DESCRIPTION

According to the techniques described herein, a system and method for an interactive digitally rendered avatar of a subject person is provided. The example embodiments allow one or more users to virtually interact with the digitally rendered avatar of the subject person in a way that mimics or emulates the speech, mannerisms, and inflections of the subject person.

The example embodiments described herein make use of methods and systems employing artificial intelligence (AI). As used herein, "artificial intelligence" may include any known methods or techniques in machine learning and related fields. As examples, artificial intelligence may include systems and methods used in natural language processing (NLP) and similar fields.

Figure 1:
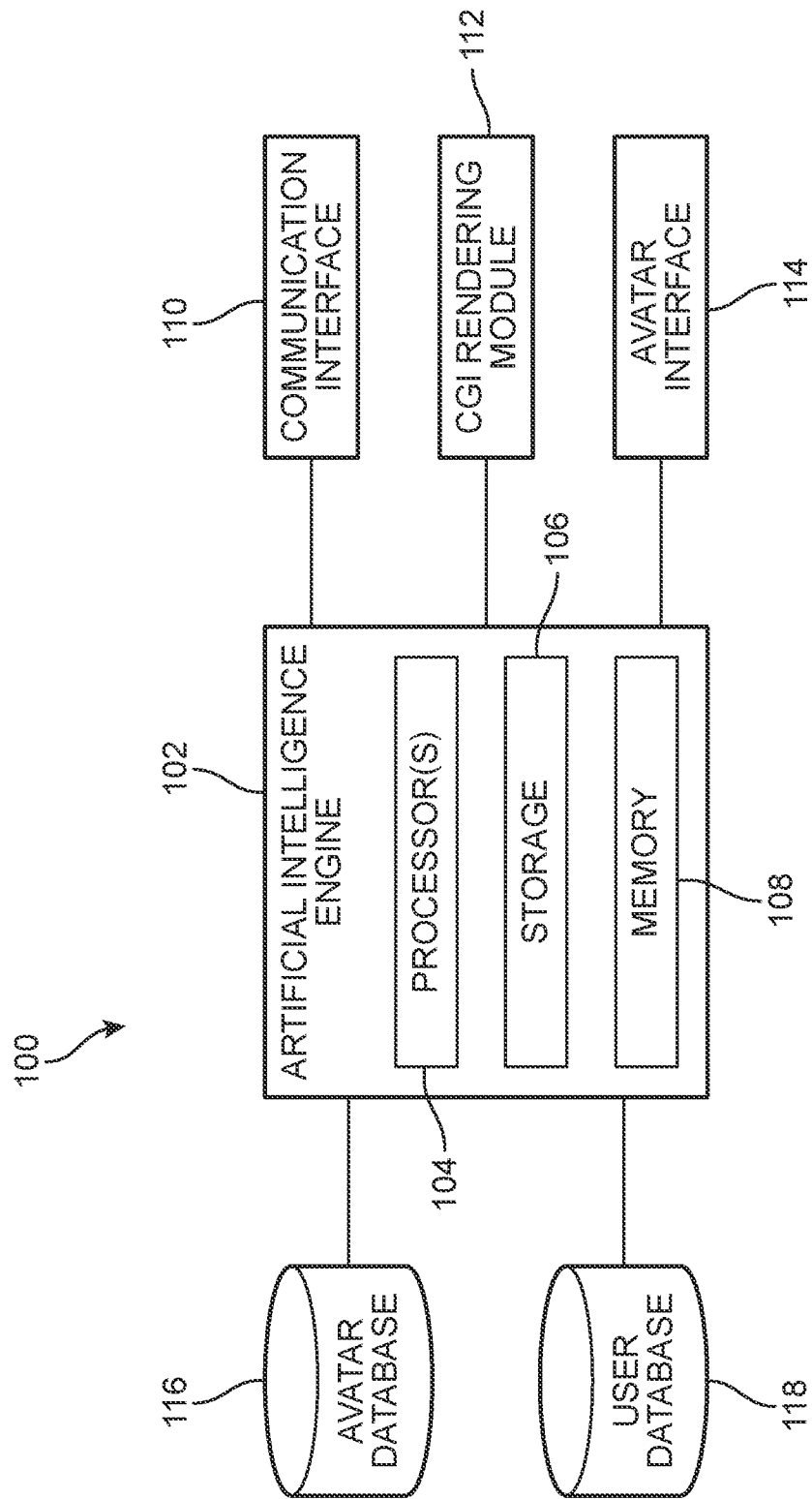
FIG. 1 is a block diagram of an example embodiment of a system for an interactive digitally rendered avatar of a subject person.

FIG. 1 is a block diagram of an example embodiment of a system 100 for providing an interactive digitally rendered avatar of a subject person. In some embodiments, components of interactive digitally rendered avatar system 100 (also referred to herein as "system 100") may be implemented in hardware, software, and/or a combination of hardware and software to execute the functions and operations described herein to provide an interactive digitally rendered avatar. As will be described in more detail below, system 100 uses an artificial intelligence (AI) engine 102 to process and analyze a plurality of data associated with one or more subject persons and uses the data to render and generate an interactive avatar of the subject person that is configured to mimic or emulate the speech, mannerisms, and inflections of the subject person.

In an example embodiment, AI engine 102 may include at least one computer system having a processor configured to execute programs to implement the techniques described herein. The term "computer system" refers to the computing resources of a single computer, the partial computing resources of a single computer, a plurality of computers communicating with one another, a network of remote servers, or other computing devices having at least one processor. In one embodiment, the computer system implementing AI engine 102 includes at least one processor, for example, a processor 104, configured to implement the functions of the interactive digitally rendered avatar system (e.g., system 100) described herein.

AI engine 102 may also include persistent storage 106 and a memory 108. In an example embodiment, storage 106 and memory 108 are computer readable storage media. For example, persistent storage 106 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information. In some embodiments, the media used by storage 106 may also be removable. For example, a removable hard drive may be used for storage 106. Other examples include optical and magnetic disks, thumb drives, and smart cards that are inserted into a drive for transfer onto another computer readable storage medium that is also part of storage 106.

Memory 108 may include random access memory (RAM) and/or cache memory. In general, memory 108 can include any suitable volatile or non-volatile computer readable storage media. Instructions for executing operations of AI engine 102 may be stored in storage 106 and/or memory 108 for execution by processor(s) 104.

One or more programs may be stored in storage 106 for execution by one or more of the respective computer processors 104 via one or more memories of memory 108. For example, the one or more programs may include software instructions that, when executed by the one or more processors 104, cause AI engine 102 to perform the operations of the interactive digitally rendered avatar system (e.g., system 100) described herein and shown in connection with the accompanying Figures.

Aspects of the example embodiments are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

In addition, AI engine 102 may include additional computing system components, such as a bus to provide communication between processor(s) 104, storage 106, and memory 108, as well as other components of system 100, such as a communication interface 110, a computer graphics interface (CGI) rendering module 112, an avatar interface 114, one or more databases (including an avatar database 116 and a user database 118), as well as various input/output (I/O) interface(s) that facilitate communication between the various components of system 100.

Communication interface 110 provides for communications with other data processing systems or devices over a communication network. In an example embodiment, communication interface 110 may include one or more network interface cards. Communication interface 110 may provide communications through the use of either or both physical and wireless communications links. In an example embodiment, communication interface 110 may be configured to communicate using multiple types or formats of communication, including, but not limited to broadcast, multicast or other one-to-many communication sessions with a plurality of users, as well as one or more one-on-one communication sessions with individual users, such as two-way communication sessions that include transmitting and/or receiving video, audio, and/or text.

The communication network may be implemented by any number of any type of communications network (e.g., LAN, WAN, Internet, Intranet, VPN, etc.). The computer or other processing systems of the example embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

In an example embodiment, system 100 includes computer graphics interface (CGI) rendering module 112. CGI rendering module 112 is configured to generate a digital representation of a subject person, including at least a face/head or a partial or full body of the subject person. In an example embodiment, the interactive digital avatar of the subject person rendered and generated by CGI rendering module 112 may be output for display through avatar interface 114 to interact with one or more users, as will be described in more detail below.

In the embodiment of FIG. 1, AI engine 102 may be in communication with one or more databases, avatar database 116 and/or user database 118. Databases 116, 118 could be co-located with AI engine 102 or could be remote databases that are accessible by AI engine 102 over a communication network. Databases 116, 118 can include any kind of storage devices, including but not limited magnetic, optical, magneto-optical, and/or memory, including volatile memory and non-volatile memory.

In one embodiment, avatar database 116 may include one or more data collections containing information associated with each subject person and their associated avatar that may be digitally rendered using system 100, as will be described in detail below in reference to FIG. 2. User database 118 may include data or information associated with one or more users of system 100, as will be described in detail below in reference to FIG. 3.

In some embodiments, CGI rendering module 112 may receive information or data about the subject person from AI engine 102, including information or data about the subject person stored in avatar database 116, that allows CGI rendering module 112 to digitally render and generate an interactive avatar of the subject person that physically resembles the subject person and that is configured to mimic or emulate the speech, mannerisms, and inflections of the subject person.

Figure 2:
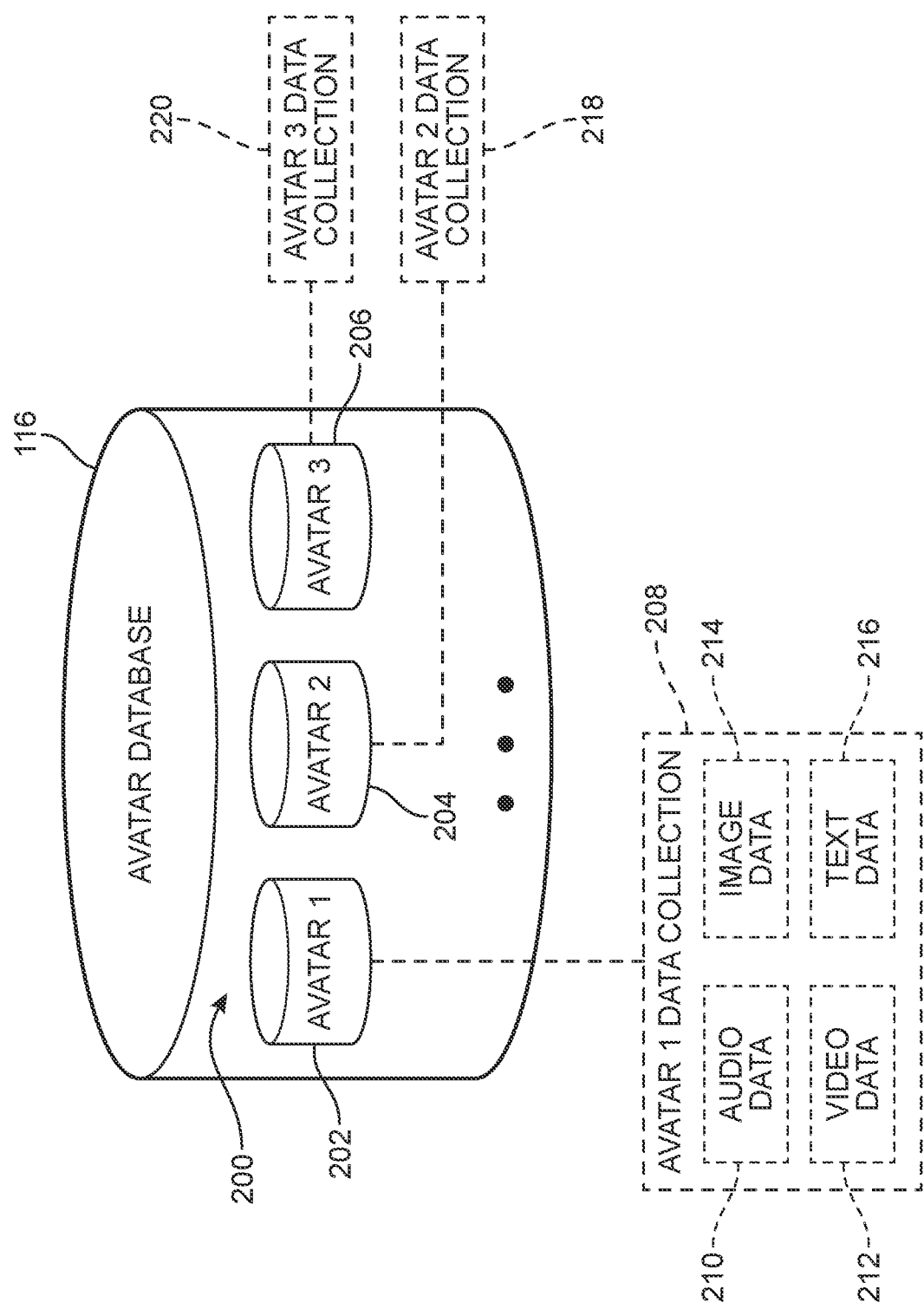
FIG. 2 is a detailed view of an example embodiment of an avatar database.

Referring now to FIG. 2, a detailed view of an example embodiment of avatar database 116 is shown. In some embodiments, avatar database 116 may include one or more data collections comprising data or information associated with a subject person that allows AI engine 102 to generate an interactive digital avatar of the subject person. In an example embodiment, avatar database 116 may include a plurality of data collections 200 for one or more avatars of a subject person or subject persons. As shown in FIG. 2, plurality of data collections 200 includes data collections associated with each of a first avatar 202, a second avatar 204, and a third avatar 206. It should be understood that data collections for three avatars (202, 204, 206) are shown in FIG. 2 for purposes of illustration and avatar database 116 may include data collections for any number of avatars.

In some embodiments, a data collection and/or training process may be executed by AI engine 102 of system 100 to obtain, sort, analyze, and process the various data forming plurality of data collections 200 that is stored in avatar database 116 associated with each avatar. Additionally, AI engine 102 may also execute one or more training sessions using CGI rendering module 112 to generate a digital representation of the subject person for each subject person's avatar. These training sessions may be used to refine the interactive avatar of the subject person to accurately mimic or emulate the speech, mannerisms, and inflections of the subject person. In some embodiments, these training processes or sessions may be implemented using machine-learning techniques.

In some cases, plurality of data collections 200 may be associated with avatars of different subject persons. For example, a first data collection 208 for first avatar 202 may be associated with a first subject person, a second data collection 218 for second avatar 204 may be associated with a second subject person that is different from the first subject person, and a third data collection 220 for third avatar 206 may be associated with a third subject person that is different from both the second subject person and the first subject person.

Additionally or alternatively, plurality of data collections 200 may also be associated with avatars of the same subject person at different ages or age ranges. For example, first data collection 208 for first avatar 202 may be associated with a first subject person at a first age (or first age range) and second data collection 218 for second avatar 204 may be associated with the same first subject person at a second age (or second age range) that is different than the first age (e.g., at an older or younger age or age range).

By storing different data collections for avatars of the same subject person at different ages or ages ranges, the subject person may have an interactive digital avatar that mimics or emulates the speech, mannerisms, and inflections of the subject person at a first age and another interactive digital avatar that mimics or emulates the speech, mannerisms, and inflections of the subject person at a second age that is older or younger than the first age. With this arrangement, interactive digital avatars of the same subject person at different ages can accurately represent the physical appearance and speech, mannerisms, and inflections of the subject person at different time periods in the subject person's life.

In this embodiment, a representative data collection, for example, first data collection 208 for first avatar 202 is shown in detail. In an example embodiment, each data collection of plurality of data collections 200 may include various types and formats of data or information associated with a subject person. For example, as shown in FIG. 2, first data collection 208 may include audio data 210, video data 212, image data 214, and/or text data 216 associated with a subject person.

Audio data 210 can include one or more voice files or recordings of the subject person speaking or reading so that AI engine 102 may use audio data 210 to accurately mimic the speech, voice inflections, and manner of speaking of the subject person. For example, audio data 210 may include archived speeches by the subject person, recorded audio messages, songs, or readings by the subject person. Additionally, audio data 210 may also include audio files of the subject person obtained from video data 212.

Video data 212 can include one or more video files or recordings of the subject person so that AI engine 102 may use video data 212 to accurately mimic facial expressions, hand movements, body posture, and other physical mannerisms of the subject person. For example, video data 212 may include short or long clips or movies of the subject person, including professional or home movies, as well as other video recordings from security cameras or motion capture devices.

Image data 214 can include one or more image files or photographs of the subject person so that AI engine 102 may use image data 214 to accurately render and generate the physical characteristics of at least the face/head or the partial or full body of the subject person from a variety of different angles and perspectives. AI engine 102 may use CGI rendering module 112 to generate a three-dimensional representation of the subject person from the plurality of two-dimensional representations of the subject person from image data 214. Additionally, image data 214 may also include one or more frames of the subject person obtained from video data 212.

Text data 216 can include one or more text files or data written, typed, or otherwise generated by the subject person. For example, text data 216 may include letters, emails, text messages, books, presentations, social media posts or comments, or any other format of text written or generated by the subject person.

In addition, audio data 210, video data 212, image data 214, and/or text data 216 associated with the subject person stored in first data collection 208 may include dates, time stamps, or other identifiers of time that allow AI engine 102 to identify a time period or age range of the subject person when the associated data was generated. With this arrangement, first data collection 208 can represent the collected information or data associated with the subject person at a particular age or age range of their life so that the interactive digital avatar generated by AI engine 102 can accurately reflect the subject person at that particular age or age range.

As described herein, a subject person may include any person living or deceased. Examples of a subject person include, but are not limited to: celebrities, politicians or elected officials, athletes, scholars, teachers or professors, authors, trainers, experts in various fields, family members, historical figures, private individuals, or any other person. With this arrangement, any subject person may have a collection of data that allows AI engine 102 to generate an interactive digital avatar for that person.

In some embodiments, system 100 may certify or authenticate an avatar of a subject person to verify or confirm that the interactive digital avatar of the subject person is approved or authorized by the subject person. For example, an interactive digital avatar according to the example embodiment may include an indicia or certificate that asserts to users of system 100 that the avatar is verified as an official avatar approved by the subject person. With this arrangement, users can be assured of interacting with approved avatars of the subject person and imposter or fake avatars of the subject person may be avoided by users.

Figure 3:
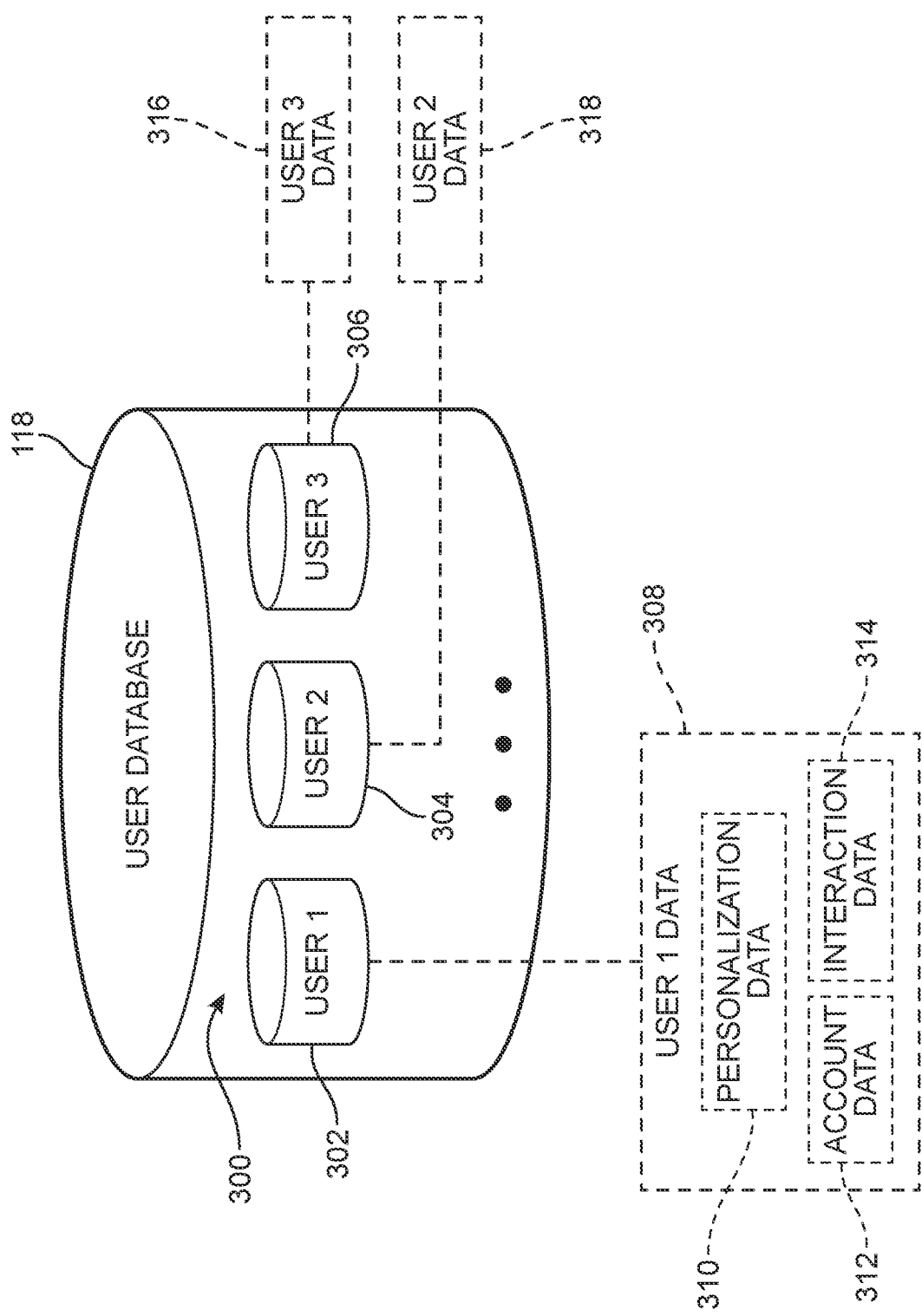
FIG. 3 is a detailed view of an example embodiment of a user database.

Referring now to FIG. 3, a detailed view of an example embodiment of user database 118 is shown. In some embodiments, system 100 may store information or data associated with one or more users of system 100. That is, users may be any person that interacts with one or more of the interactive digital avatars of a subject person generated by system 100. In an example embodiment, user database 118 may include a plurality of user files 300 that contain data sets associated with each user of system 100. In this embodiment, plurality of user files 300 includes a user file for a first 302, a user file for a second user 304, and a user file for a third user 306. It should be understood that user files for three users (302, 304, 306) are shown in FIG. 3 for purposes of illustration and user database 118 may include user files for any number of users of system 100.

In this embodiment, a representative user file, for example, a first data set 308 for first user 302 is shown in detail. In an example embodiment, each data set included in the user files of plurality of user files 300 may include various types of data or information associated with a user of system 100. For example, as shown in FIG. 3, first data set 308 may include personalization data 310, account data 312, and/or interaction data 314 associated with a user (e.g., first user 302).

Personalization data 310 can include various personal data or information associated with first user 302 so that AI engine 102 may use personalization data 310 to customize or personalize the interaction between a digital avatar and first user 302. For example, personalization data 310 may include the user's name, birthday, hair or eye color, names of family members, the user's preferences (e.g., nicknames, topics of conversation, greeting types, favorite subjects, etc.), and other information that can be used by AI engine 102 to personalize or customize interactions between the user and the digital avatar of the subject person.

Account data 312 can include account identifiers, such as user names and passwords or account numbers, billing and payment information for the user, including payment types (e.g., credit cards or cryptocurrency), billing addresses, subscription or account plan information, etc. For example, system 100 may bill or charge users on a per transaction basis (i.e., for each interactive avatar session), on a time basis (e.g., on a per minute or other time increment basis), and/or may include various tiers or membership plans that offer varying degrees or amounts of access to digital avatars. In some cases, different avatars may have different fees or rates. In other cases, system 100 may be free to users and may generate revenue through advertising or other types of sponsorships, including virtual endorsements by one or more of the digital avatars of system 100.

Interaction data 314 can include various information and data associated with one or more interactive avatar sessions between the user and one or more avatars of a subject person or subject persons. For example, interaction data 314 may include log files or other captured transcripts of conversations between the user and the avatar, including dates, times, duration of the interaction, topics discussed, etc. The information or data included in interaction data 314 may be used by system 100 for billing purposes as well as to improve the personalization or customization of the interaction between the user and the digital avatar of the subject person. For example, information or data included in interaction data 314 obtained from an interactive session with a digital avatar (such as a user describing favorite colors or foods, or referring to family members by name or relationship) may be added to personalization data 310 in first data set 308 for first user 302 to be used by AI engine 102 in subsequent interactive sessions with a digital avatar to provide personalized or customized interactions with the user.

Plurality of user files 300 may include a similar user file for each user of the plurality of users of system 100 that is stored in user database 118. For example, second user 304 may have a second data set 316 and third user 306 may have a third data set 318 that include data and information of a similar type and category as the data and information associated with first data set 308, but that is specific to the individual user. That is, each user (first user 302, second user 304, and third user 306) will have a unique data set in their user file stored in user database 118 that includes their own personalization data, account data, and interaction data. In this manner, user database 118 may be used by AI engine 102 of system 100 to ensure that each interactive session between a user and a digital avatar of a subject person is a uniquely personalized and/or customized experience, even when users are interacting with digital avatars of the same subject person. With this arrangement, because the interactive session uses the user's own data set from their user file, no two interactive sessions will be the same.

Figure 4:
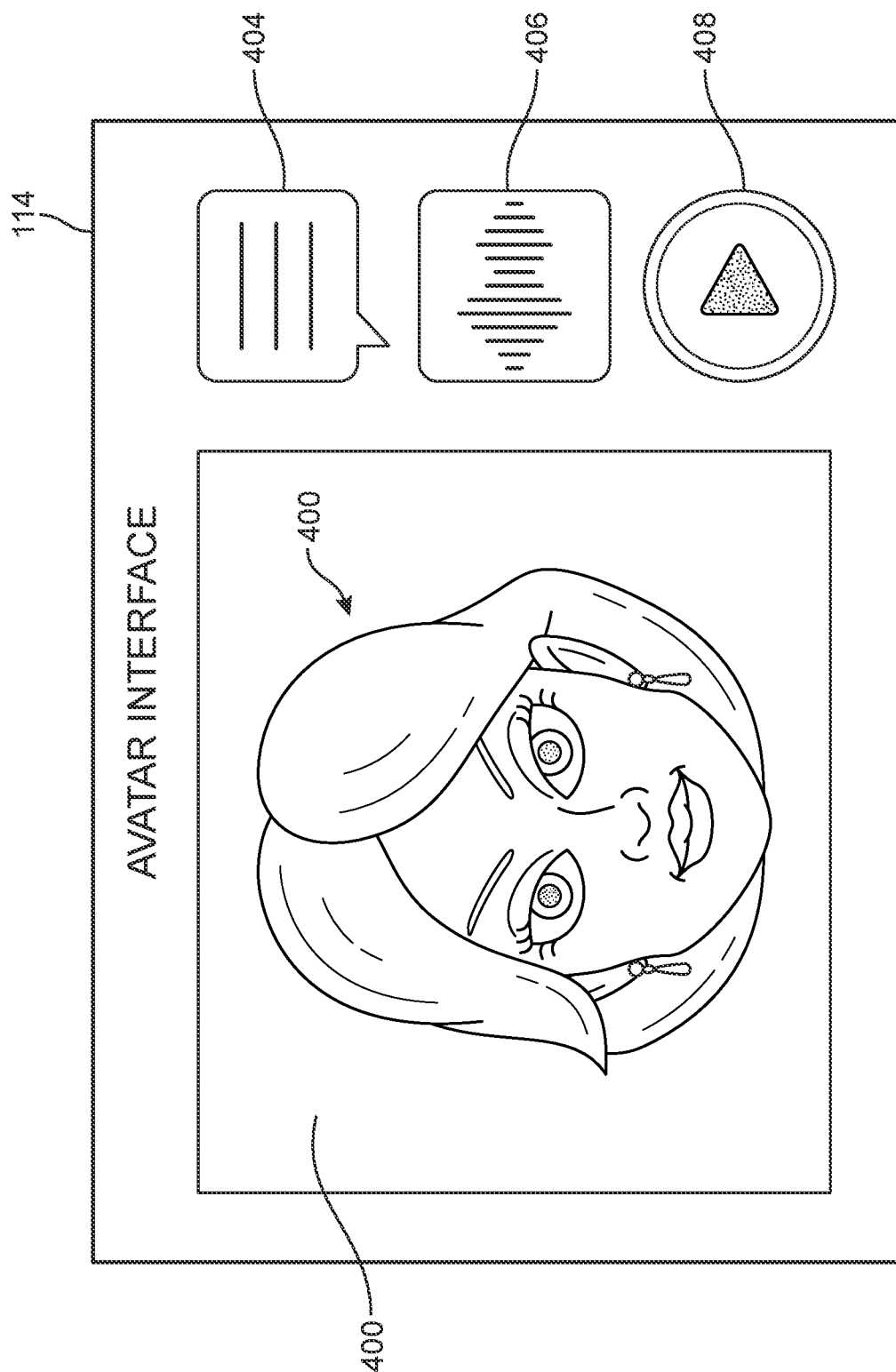
FIG. 4 is a representative view of an example embodiment of an avatar interface.

Referring now to FIG. 4, a representative view of an example embodiment of avatar interface 114 is shown. As described above, an interactive digital avatar of a subject person may be rendered and generated by CGI rendering module 112 and is output for display through avatar interface 114 to interact with one or more users. In this embodiment, avatar interface 114 includes a display area 400 in which an interactive digital avatar 402 is displayed. In an example embodiment, avatar interface 114 may be configured as an application or software program that executes instructions from AI engine 102 and CGI rendering module 112 to output interactive digital avatar 402 in display area 400 of avatar interface 114. In some embodiments, avatar interface 114 may be displayed on a display of a user interface of a user interacting with system 100, such as one or more of the user interfaces described below in reference to FIG. 5.

In some embodiments, avatar interface 114 may embedded or integrated into an existing application or software program to allow the existing application or software program to provide the functionality of an interactive digital avatar in accordance with the techniques described herein. In these embodiments, components of system 100 may be provided as a module that interacts with and is included in the existing application or software program to provide interactive digital avatar capabilities to that existing application or software program. For example, an existing video calling, meeting, or presentation application or software program may incorporate the functionality of an interactive digital avatar using system 100.

In some embodiments, avatar interface 114 may provide one or more different types or forms of communication between interactive digital avatar 402 and the user interacting with interactive digital avatar 402 through avatar interface 114. In this embodiment, avatar interface 114 includes one or more of text 404, audio 406, and video 408 options for a user to interact with interactive digital avatar 402. For example, a user may choose to engage with interactive digital avatar 402 via text 404 by typing on a keyboard or touchscreen input, via audio 406 by speaking into a microphone or other audio sensor to capture user's spoken words or input, and/or via video 408 by using a video camera or other recording device to speak and interact with interactive digital avatar 402.

In this embodiment, interactive digital avatar 402 shown in display area 400 of avatar interface 114 is in the form of a head and/or face of a subject person. In other embodiments, interactive digital avatar 402 may take other forms, including at least a partial or full body avatar of the subject person. For example, in some embodiments, interactive digital avatar 402 may include a representation of a subject person from the waist up and include hands and arms so that interactive digital avatar 402 may mimic or emulate hand movements or other body language of the subject person. In still other embodiments, interactive digital avatar 402 may include a full body representation of a subject person that mimics or emulates entire body movements or motions of the subject person, including, for example, walking gaits, dance moves, exercise routines, etc.

Figure 5:
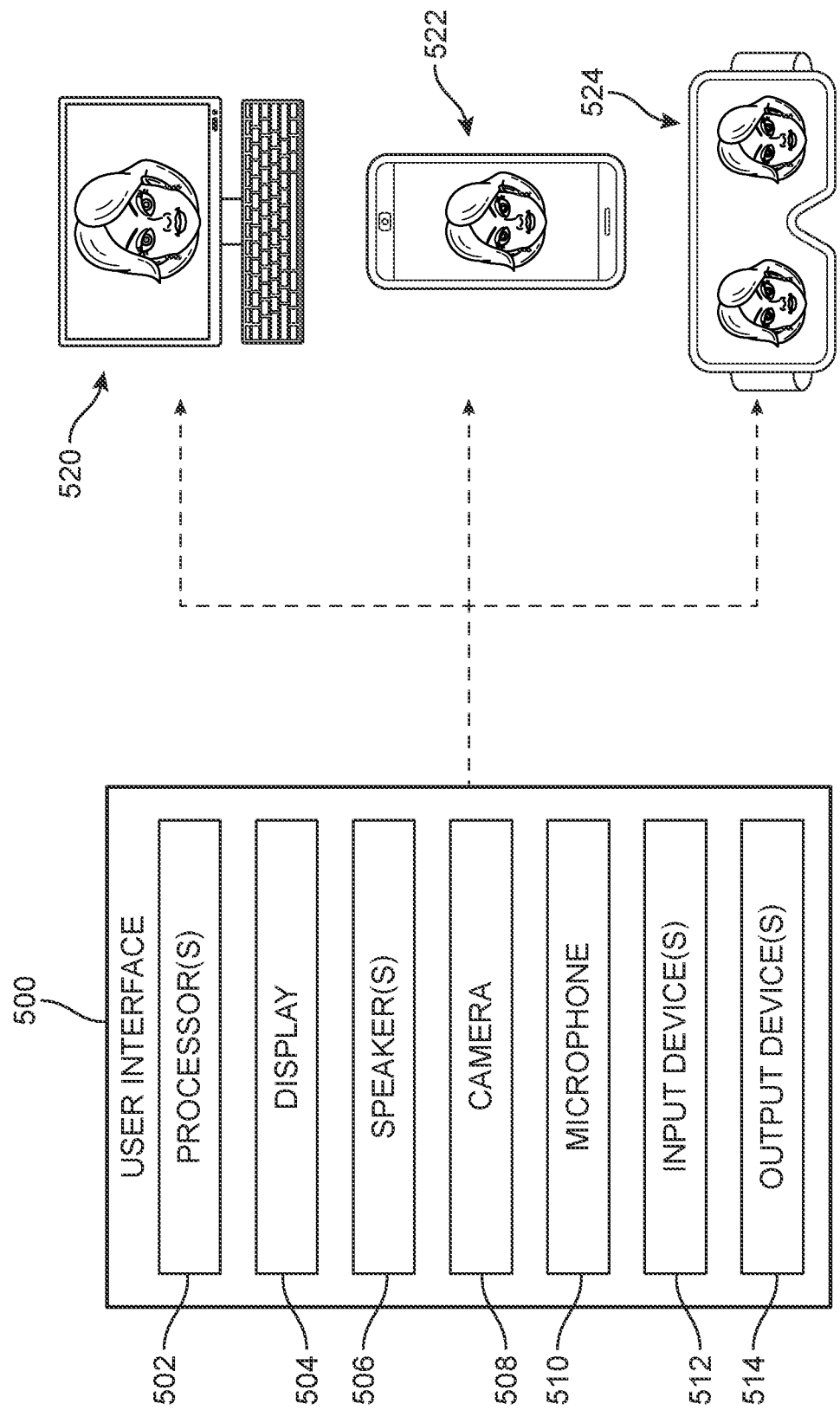
FIG. 5 is a representative view of an example embodiment of a user interface.

Referring now to FIG. 5, an example embodiment of a user interface 500 that allows a user to interact with system 100 is shown. In some embodiments, user interface 500 provides a mechanism that allows a user of system 100 to interact with or engage with an interactive digital avatar of a subject person through avatar interface 114. For example, avatar interface 114 may be an application or software program that runs or executes on user interface 500 and receives data or commands from AI engine 102 of system 100 to control the actions of the interactive digital avatar of the subject person through avatar interface 114.

In an example embodiment, user interface 500 may include at least one processor 502 and a display 504. Display 504 may be used to display the interactive digital avatar of the subject person through avatar interface 114. User interface 500 may also include one or more speakers 506 that are configured to output audio, including audio from the interactive digital avatar of the subject person through avatar interface 114. In some embodiments, user interface 500 may also include components that allows a user to send or transmit audio and/or video to system 100, such as, for example, a camera 508 configured to capture or record video and/or image information from the user and a microphone 510 configured to capture or record audio information from the user. In an example embodiment, system 100 may use inputs from a user captured by one or more of camera 508 and/or microphone 510 of user interface 500 to initiate an interactive session and/or during an interactive session with an avatar. For example, camera 508 and/or microphone 510 of user interface 500 may capture one or more of gestures, facial expressions, or body language of a user that may then be used by AI engine 102 of system 100 to start an interactive session or as an input used to determine potential responses by an interactive avatar to the user.

In some embodiments, user interface 500 may also include one or more other input devices 512 and/or one or more other output devices 514. In some embodiments, user interface 500 may also include an input and/or output to a voice assistant to allow a user to speak commands and instructions via user interface 500 to interact with system 100 and/or one or more interactive avatars generated by system 100. For example, a user may speak "initiate interactive session" to the voice assistant to request an interactive session with an interactive avatar of a subject person. With this arrangement, user interface 500 allows a user to engage in an interactive session with the interactive digital avatar of the subject person through avatar interface 114 in a manner that simulates a video and/or audio call with an actual person.

In different embodiments, user interface 500 may take any one or more of a variety of different forms or devices. For example, as shown in FIG. 5, user interface 500 may be embodied in a computer 520 on which the user may engage with interactive digital avatar of the subject person through avatar interface 114. User interface 500 may also be embodied in a mobile device 522, such as a smartphone or tablet computer, on which the user may engage with interactive digital avatar of the subject person through avatar interface 114. In still another embodiment, user interface 500 may be embodied in a virtual reality (VR) or augmented reality (AR) headset 524 on which the user may engage with interactive digital avatar of the subject person through avatar interface 114. It should be understood that the examples of user interface 500 shown in FIG. 5, including computer 520, mobile device 522, and/or VR/AR headset 524 are not limiting and other devices or forms of user interface 500 may be provided to interact with the interactive digital avatars of system 100.

Figure 6:
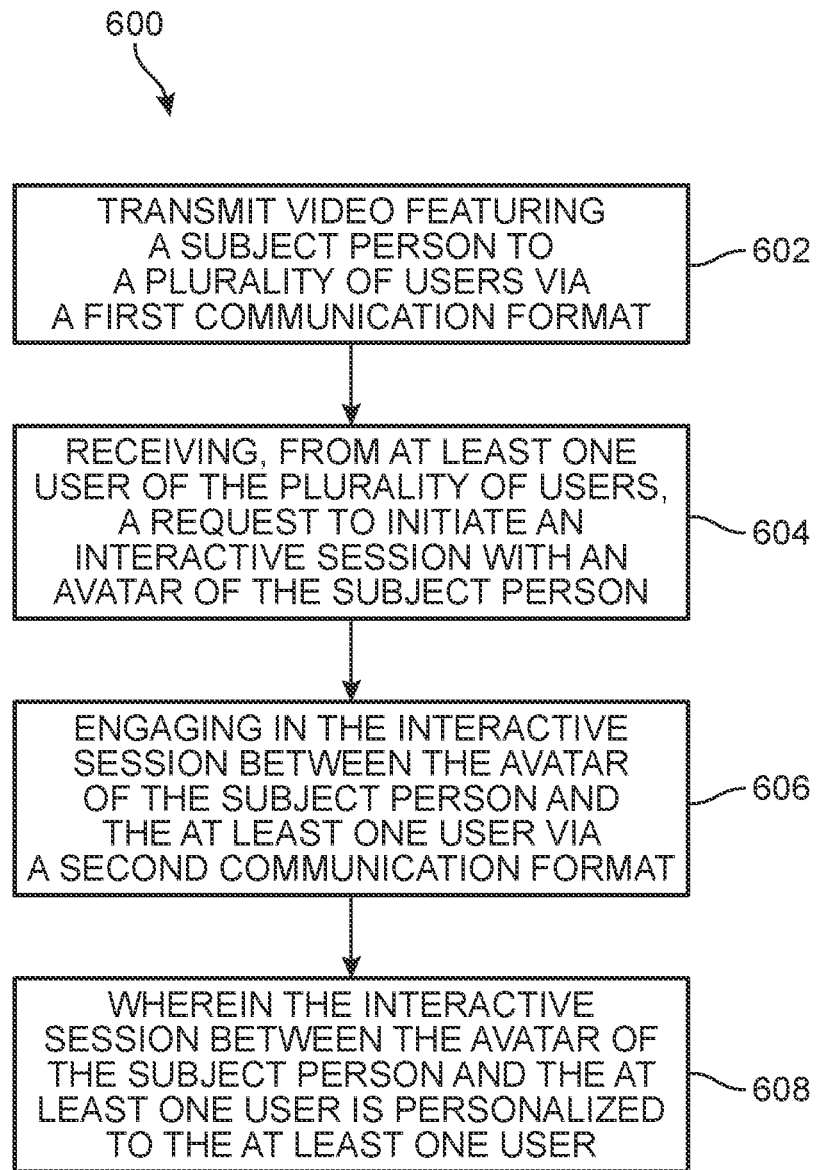
FIG. 6 is a flowchart of an example embodiment of a method for providing an interactive digitally rendered avatar of a subject person.

Referring now to FIG. 6, a flowchart of an example embodiment of a method 600 for providing an interactive digitally rendered avatar of a subject person is illustrated. In some embodiments, method 600 may be implemented by at least one processor of system 100, for example, one or more of processors 104 of AI engine 102, described above, to provide the operations of interactive digitally rendered avatar described herein. Method 600 describes one example implementation of providing an interactive digitally rendered avatar of a subject person. It should be understood that other implementations may be provided, such as upon initiation or request by a user of system 100, as well as other methods.

In this embodiment, method 600 may begin at an operation 602. At operation 602, video featuring a subject person may be transmitted to a plurality of users via a first communication format. For example, at operation 602, a live or pre-recorded video of a subject person may be broadcast or streamed to a plurality of users of system 100. Next, method 600 includes an operation 604. At operation 604, a request to initiate an interactive session with an avatar of the subject person is received from at least one user of the plurality of users. For example, at operation 604, one of the users of the plurality of users receiving the video featuring the subject person at operation 602 may choose to engage in an interactive session with an interactive digital avatar of the subject person by sending a request to system 100.

Upon receiving the request from at least one user at operation 604, method 600 may proceed to an operation 606. At operation 606, method 600 includes engaging in the interactive session between the avatar of the subject person and the at least one user via a second communication format. For example, at operation 606, system 100 may initiate an interactive session between the user and the interactive digital avatar (e.g., interactive digital avatar 402) via a two-way communication format that allows the user and the interactive digital avatar to engage in a one-on-one conversation or interaction through avatar interface 114 on user interface 500, described above.

Additionally, method 600 includes an operation 608. At operation 608, the interactive session between the avatar of the subject person and the at least one user is personalized to the at least one user. For example, as described above in reference to FIG. 3, the interaction between the user and the interactive digital avatar (e.g., interactive digital avatar 402) may be personalized or customized using information (e.g., personalization data 310) from the data set in the user's user file stored in user database 118. With this arrangement, method 600 may provide a personalized and customized interactive session with a digital avatar of a subject person that is unique to the user. Method 600 may implemented any number of times for any number of users to generate separate interactive sessions for each user. Additionally, in some cases, method 600 may be implemented simultaneously or concurrently for multiple users of the plurality of users of system 100 so that each user may experience an individual, one-on-one interactive session with the digital avatar of the subject person. Method 600 may also be implemented in a manner so that two or more interactive sessions between different users are overlapping or at least partially occurring at the same time.

Figure 7:
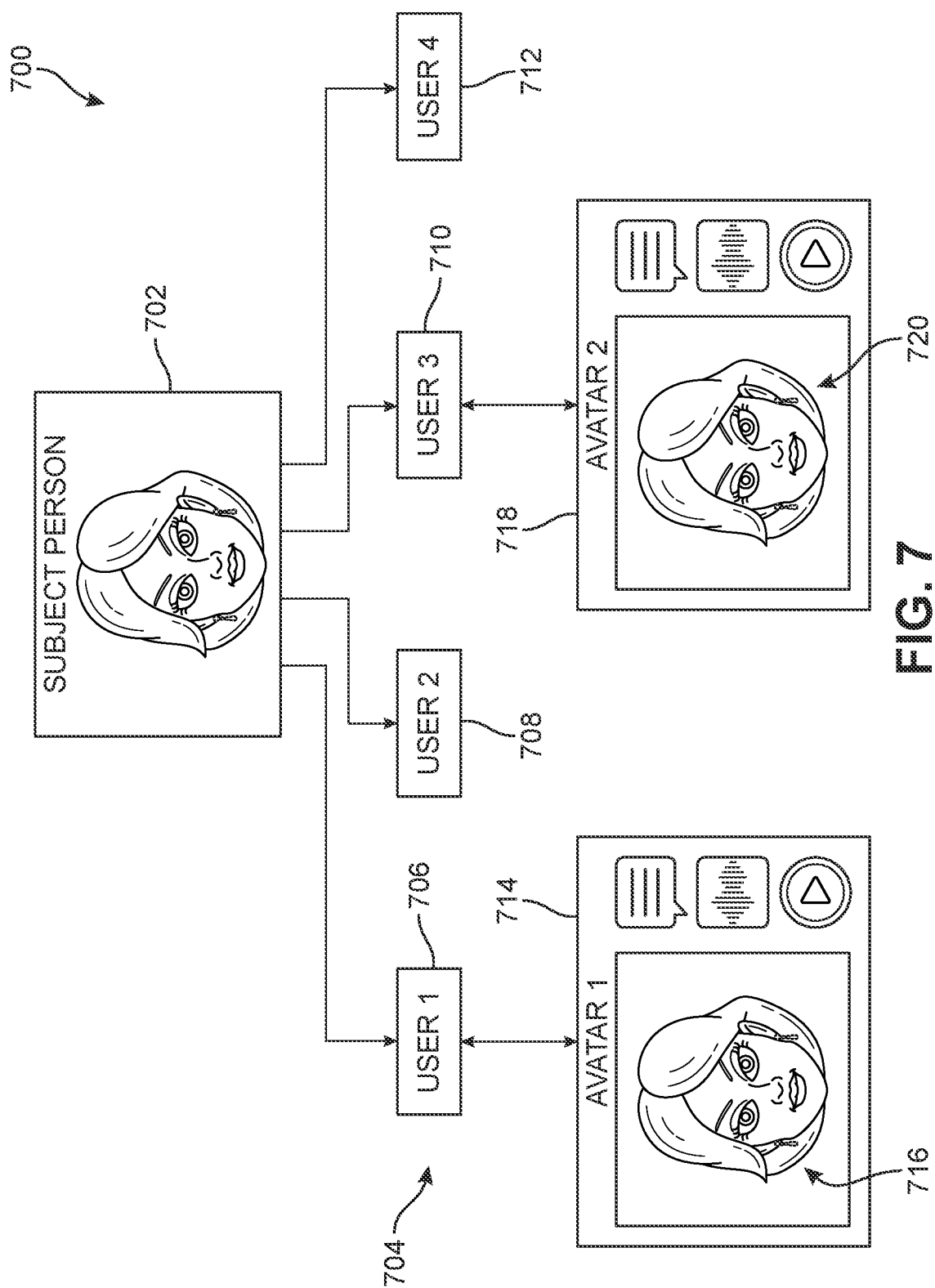
FIG. 7 is a representative view of an example embodiment of users engaging with an interactive digitally rendered avatar of a subject person.

Referring now to FIG. 7, an example embodiment of a scenario 700 in which a plurality of users are engaging with an interactive digitally rendered avatar of a subject person is shown. In this embodiment, a subject person 702, such as a celebrity or politician, is broadcasting or streaming a video to a plurality of users 704. In scenario 700, subject person 702 may be transmitting a pre-recorded video or may be live. For example, the video may be a panel discussion or talk, a movie or television program, a political rally, a sporting event, a concert, or any other live or recorded activity or event that is intended for an audience.

In an example embodiment, subject person 702 has an associated data collection stored in avatar database 116 of system 100 for an interactive digital avatar of subject person 702. For example, the data collection stored in avatar database 116 may include one or more of audio data, video data, image data, or text data associated with subject person 702 that allows AI engine 102 to generate an interactive digital avatar of subject person 702, as described above.

In an example embodiment, each subject person (e.g., subject person 702 in scenario 700) may have information or data gathered or collected for the data collection stored in avatar database 116 associated with the subject person's avatar in advance (i.e., before initiating an interactive session with the subject person's avatar). For example, as described above, a data collection and/or training process may be executed by AI engine 102 of system 100 to obtain, sort, analyze, and process the various data forming the data collection that is stored in avatar database 116 associated with the subject person's avatar. Additionally, AI engine 102 may also execute one or more training sessions using CGI rendering module 112 to generate a digital representation of the subject person for the subject person's avatar. These training sessions may be used to refine the interactive avatar of the subject person to accurately mimic or emulate the speech, mannerisms, and inflections of the subject person. In some embodiments, these training processes or sessions may be implemented using machine-learning techniques.

In this embodiment, subject person 702 in scenario 700 is shown broadcasting or streaming a video to plurality of users 704, including at least a first user 706, a second user 708, a third user 710, and a fourth user 712 (e.g., as part of operation 602 of method 600, described above). According to the example embodiments, plurality of users 704 may be located at different locations and may be using different devices (e.g., one or more types of user interfaces 500) to watch the video featuring subject person 702. In an example embodiment, when at least one user of plurality of users 704 would like to interact with a digital avatar of subject person 702 during the video, that user may send or transmit a request to system 100 to initiate an interactive session with an avatar of subject person 702 (e.g., as part of operation 604 of method 600, described above).

In this embodiment, first user 706 has made a request to start an interactive session with a digital avatar of subject person 702. In response, system 100 generates and renders a first interactive avatar 716 through a first avatar interface 714 to allow first user 706 to interact with first interactive avatar 716 of subject person 702. In contrast to the video from subject person 702 to plurality of users 704 (which may be a one-way communication, such as a broadcast or stream), the interactive session between first user 706 and first interactive avatar 716 is a two-way communication that allows text, audio, and/or video to be transmitted and received in a bi-directional manner between first user 706 and first interactive avatar 716. For example, in one embodiment, the two-way communication between first user 706 and first interactive avatar 716 may be provided through first avatar interface 714 and at least one user interface 500 associated with first user 706.

Additionally, any of the other users of plurality of users 704 may also separately, simultaneously, or concurrently request to start their own interactive session with a digital avatar of subject person 702. In response to each such request, system 100 may generate and render additional instances of interactive digital avatars of subject person 702 to interact with each additional user making a request. For example, as shown in FIG. 7, third user 710 has also made a request to start an interactive session with a digital avatar of subject person 702. This request may be made at the same time as the request by first user 706 or may be made at a different time that is earlier or later than the request by first user 706. In response, system 100 generates and renders a second interactive avatar 720 through a second avatar interface 718 to allow third user 710 to interact with second interactive avatar 720 of subject person 702.

According to the example embodiments, each of first user 706 and third user 710 are engaging in an interactive session with a digital avatar of the same subject person (e.g., subject person 702), however, system 100 provides each user with their own instance of an interactive digital avatar (e.g., first interactive avatar 716 for first user 706 and second interactive avatar 720 for third user 710). With this arrangement, each user may have a personalized and customized interactive session with their specific instances of the digital avatar of subject person 702.

Figure 8:
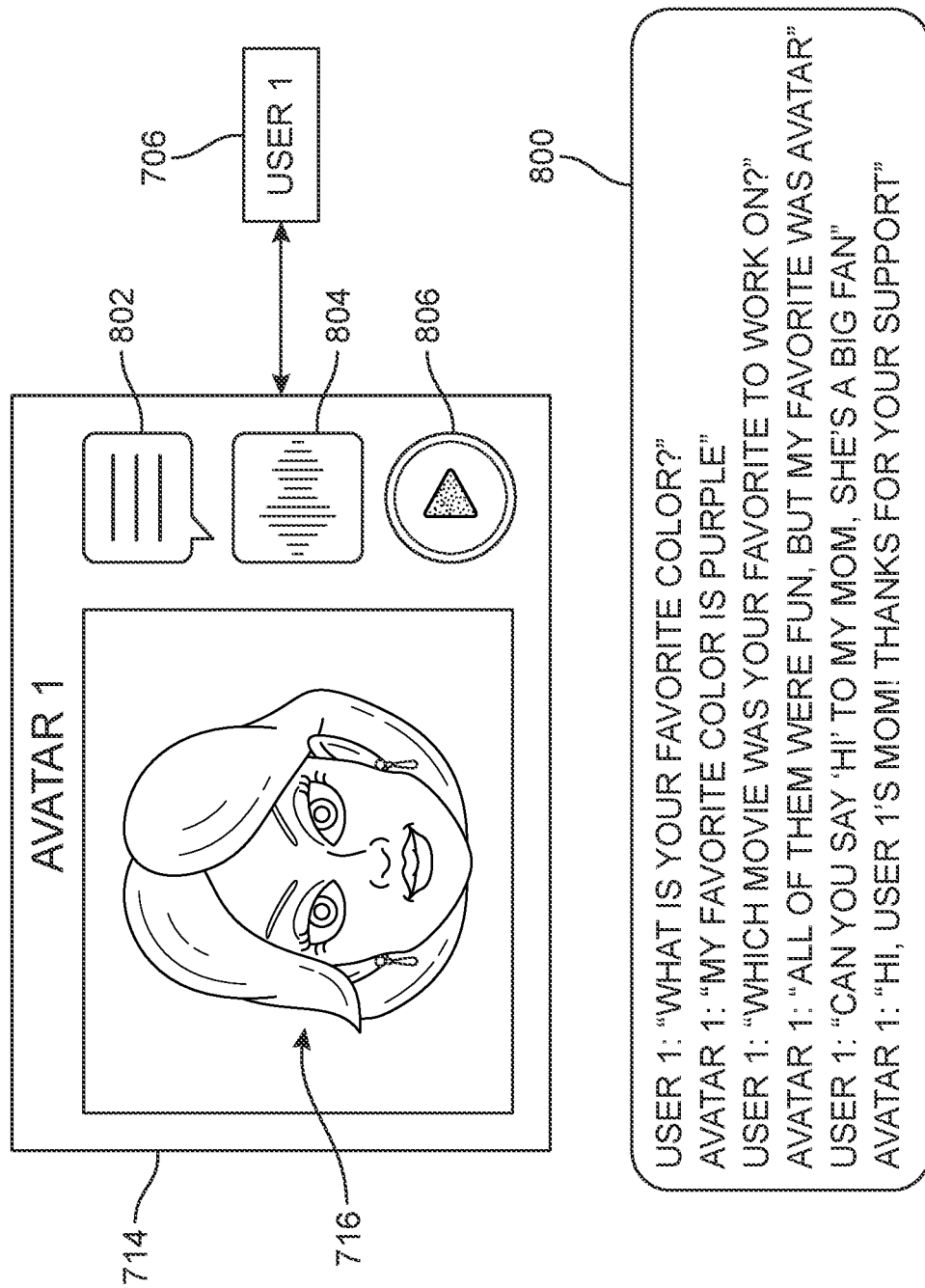
FIG. 8 is a detailed view of an example embodiment of an interaction between a user and an interactive digitally rendered avatar of a subject person.

Referring now to FIG. 8, a detailed view of an example embodiment of an interaction between a user and an interactive digitally rendered avatar of a subject person is shown. In this embodiment, a representative interactive session 800 between first user 706 and first interactive avatar 716 of subject person 702 is shown. In an example embodiment, communication during interactive session 800 between first interactive avatar 716 and first user 706 may be made through first avatar interface 714 which may be provided on at least one type of user interface 500 associated with first user 706. In this embodiment, first avatar interface 714 includes one or more of text 802, audio 804, and video 806 options for first user 706 to interact with first interactive avatar 716.

For example, as described above, first user 706 may engage with first interactive avatar 716 via text 802 by typing on a keyboard or touchscreen input associated with user interface 500, via audio 804 by speaking into a microphone or other audio sensor associated with user interface 500 to capture spoken words or input by first user 706, and/or via video 806 by using a video camera or other recording device associated with user interface 500 to allow first user 706 to speak and interact with first interactive avatar 716 during interactive session 800.

In various embodiments, interactive session 800 between first user 706 and first interactive avatar 716 of subject person 702 may include any discussion of topics or interests that first user 706 would like to discuss. For example, in this embodiment of interactive session 800, first user 706 has asked first interactive avatar 716 "What is your favorite color?" to which first interactive avatar 716 has responded "My favorite color is purple." The information or data used to generate the responses by first interactive avatar 716 during interactive session may be obtained from the data collection associated with the avatar stored in avatar database 116, described above. For example, the data collection may include at least one instance of text, audio, video, or image data where subject person 702 has stated that her favorite color is purple. Accordingly, system 100 may retrieve this information from avatar database 116 in order to allow first interactive avatar 716 of subject person 702 to answer the question from first user 706.

Interactive sessions may further include other representative topics. For example, in this embodiment of interactive session 800, subject person 702 is an actress and first user 706 has asked first interactive avatar 716 "Which movie was your favorite to work on?" to which first interactive avatar 716 has responded "All of them were fun, but my favorite was Avatar."

Additionally, as described above, in some embodiments, the interactive session between a user and the interactive digital avatar may be personalized or customized for the particular user, for example, using personalization data 310 stored in user database 118, described above. In this embodiment of interactive session 800, first user 706 has asked first interactive avatar 716 "Can you say 'Hi' to my mom, she's a big fan?" to which first interactive avatar 716 has responded "Hi, 'User 1's Mom!' Thanks for your support".

In an example embodiment, system 100 may use personalization data 310 stored in user database 118 for first user 706 to replace "User 1's Mom" in the response provided by first interactive avatar 716 with the actual name of first user 706's mom. In this case, the response by first interactive avatar 716 would appear to first user 706 as "Hi, Nancy! Thanks for your support" (i.e., where "Nancy" is the name of first user 706's mom obtained by system 100 from personalization data 310). With this arrangement, first user 706 may experience a uniquely personalized and customized interactive session 800 with first interactive avatar 716 of subject person 702.

In some embodiments, system 100 may use personalization data 310 of first user 706 to suggest calling or sending a message to a third person associated with first user 706 (e.g., a family member, friend, colleague, coworker, etc.) using first interactive avatar 716. For example, a friend of first user 706 may be a big fan of subject person 702 (e.g., which may be known from personalization data 310 of first user 706 stored in user database 118) and would be excited to be contacted by first interactive avatar 716 of subject person 702 to wish them a Happy Birthday or to receive some other type of personalized message or call. In addition, such third party interactions may help add additional users to system 100.

In other embodiments, an interactive session between a user and an interactive digital avatar of a subject person may be limited to a predetermined number of topics or responses. For example, system 100 may prepare and save in avatar database 116 for each avatar, a menu or list of potential questions and their associated responses that may be used during an interactive session with a subject person's avatar. The predetermined topics or responses may be obtained by processing and analyzing the data collection associated with the subject person and/or may be prepared in advance by the subject person.

Figure 9:
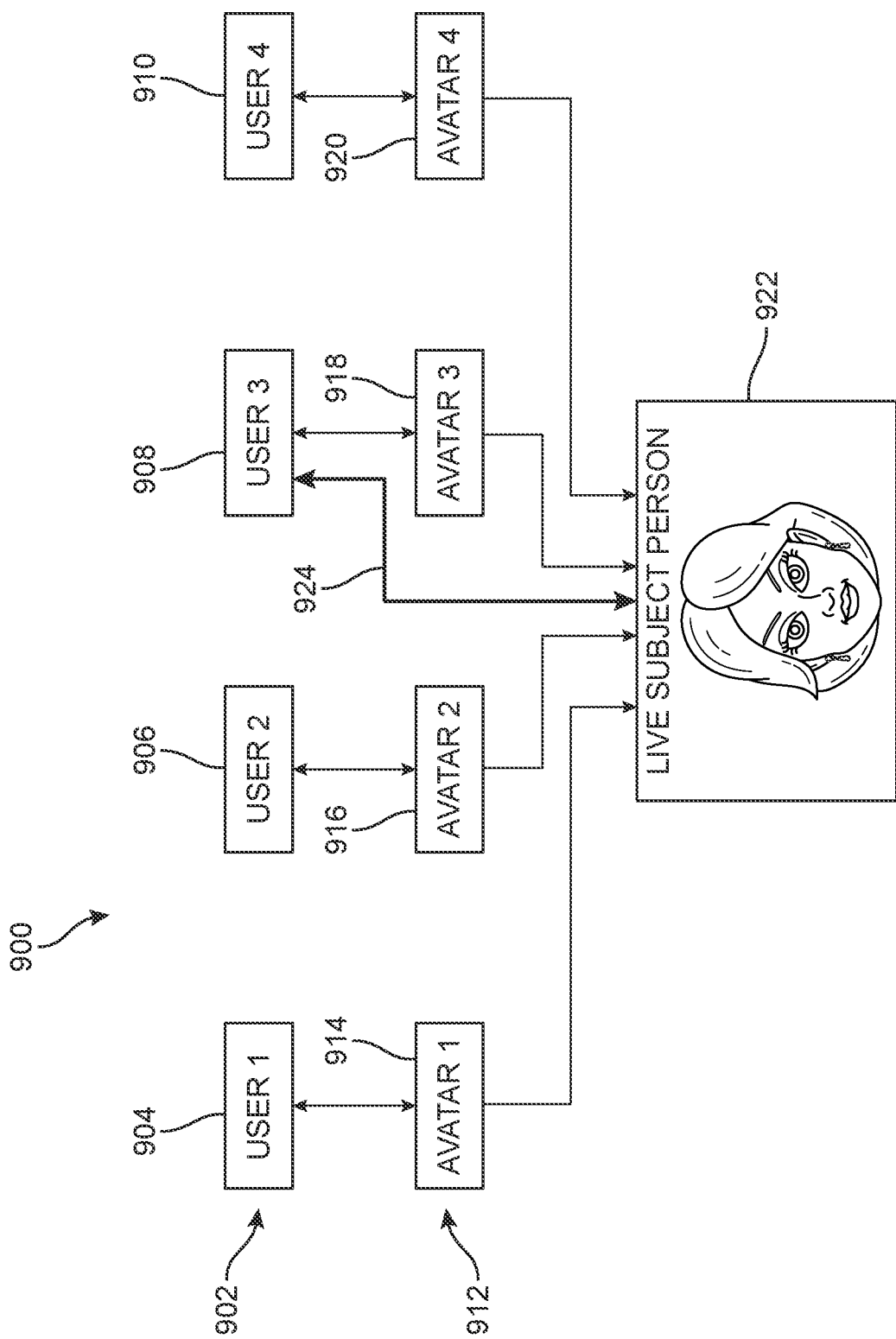
FIG. 9 is a representative view of an example embodiment of multiple users interacting with multiple interactive digitally rendered avatars of a subject person.

Referring now to FIG. 9, a representative view of an example embodiment of multiple users interacting with multiple interactive digitally rendered avatars of a subject person is shown. In this embodiment, a scenario 900 in which a plurality of users 902 are engaging with a plurality of interactive digitally rendered avatars 912 of a subject person 922 is shown. In this embodiment, each user of plurality of users 902, including a first user 904, a second user 906, a third user 908, and a fourth user 910 is engaging in an interactive session with their own unique instance of an interactive digitally rendered avatar of subject person 922. For example, as shown in FIG. 9, first user 904 is engaging in an interactive session with a first interactive avatar 914, second user 906 is engaging in an interactive session with a second interactive avatar 916, third user 908 is engaging in an interactive session with a third interactive avatar 918, and fourth user 910 is engaging in an interactive session with a fourth interactive avatar 920.

In this embodiment, each interactive avatar of plurality of interactive digitally rendered avatars 912 (e.g., first interactive avatar 914, second interactive avatar 916, third interactive avatar 918, and fourth interactive avatar 920) are representations of the same subject person, subject person 922 in this case. However, because each user of plurality of users 902 will ask different questions and otherwise engage with their own instance of the interactive digitally rendered avatar of subject person 922 in a different manner, each of the interactive sessions will be unique from each other.

In some embodiments, information associated with one or more interactive sessions between an interactive digital avatar of a subject person and one or more users (e.g., between plurality of interactive digitally rendered avatars 912 and plurality of users 902) may be obtained for storage and/or monitoring by system 100. For example, a summary of topics discussed, questions asked by users, answers given by interactive digital avatars, as well as information about session duration and/or connection quality may be provided back to system 100 for further analysis and storage, including, in some embodiments, stored as interaction data 314 in the associated user file of the user in user database 118, as described above.

In some embodiments, the actual subject person (e.g., subject person 922) may also be monitoring the one or more interactive sessions between the subject person's interactive digital avatar and one or more users (e.g., between plurality of interactive digitally rendered avatars 912 and plurality of users 902). For example, this may allow the subject person to determine what topics of conversation or other interests are being discussed with the interactive avatars. In addition, in some embodiments, a user may ask a question to the interactive digital avatar of the subject person for which a response is not known or not available based on the information in the data collection in avatar database 116. By monitoring the interactive sessions, the actual subject person may be alerted to such a question and may be able to provide a response.

In an example embodiment, system 100 allows a live subject person, such as subject person 922 in scenario 900, to enter or cut into an existing interactive session between the subject person's interactive digital avatar and a user. The live subject person may then engage directly with the user in a live session between the live subject person and the user. For example, as shown in FIG. 9, during an interactive session between third user 908 and third interactive avatar 918, live subject person 922 may enter or cut into the interactive session to establish a live session 924 directly between third user 908 and live subject person 922. With this arrangement, if third user 908 has brought up a topic that is interesting to subject person 922 monitoring the interactive session between third user 908 and third interactive avatar 918, subject person 922 may directly engage with third user 908 in live session 924 to further explore the topic or otherwise interact with third user 908 in real time.

Figure 10:
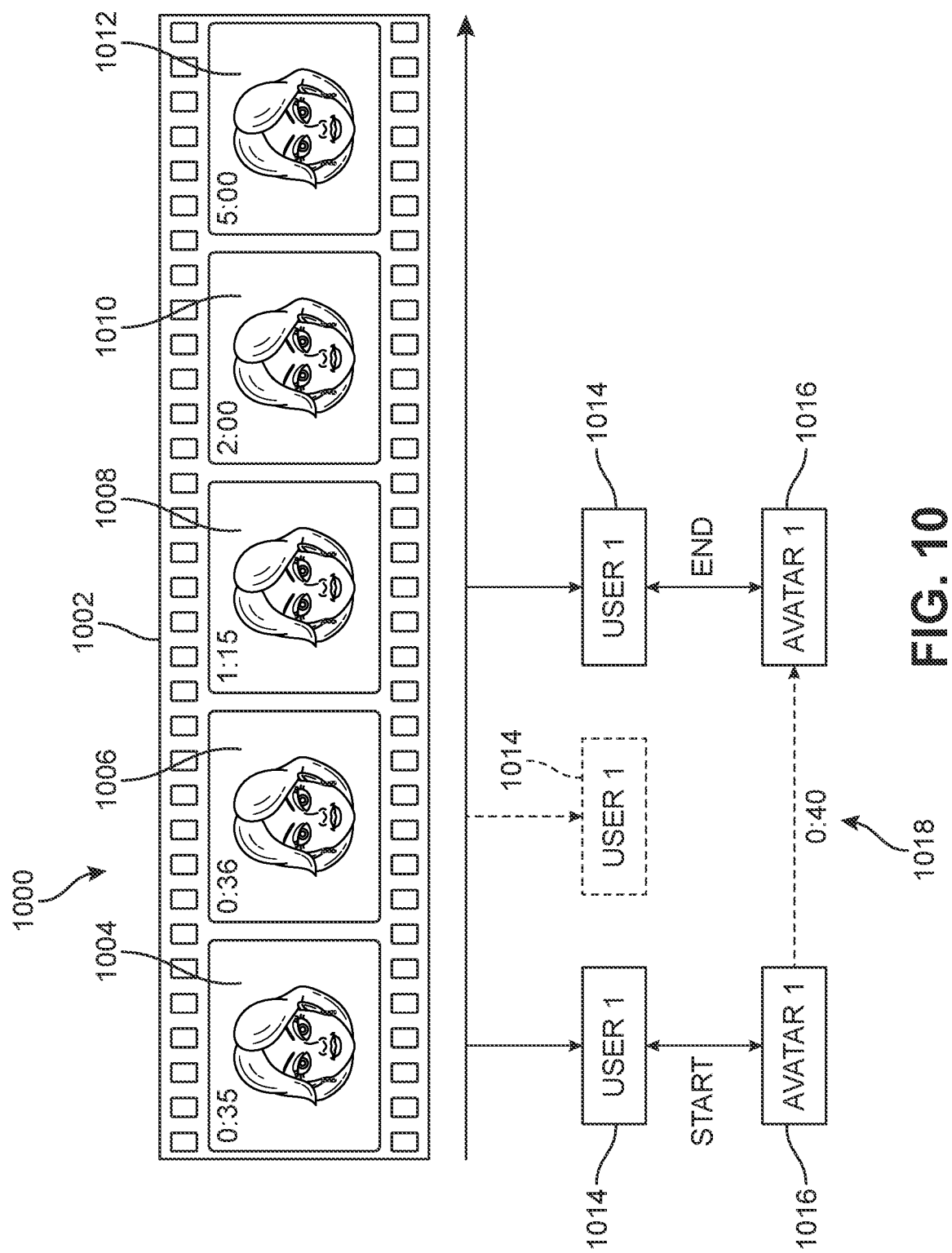
FIG. 10 is a representative view of an example embodiment of a user interacting with an interactive digitally rendered avatar of a subject person during a video.

Referring now to FIG. 10, a scenario 1000 of an example embodiment of a user 1014 interacting with an interactive digitally rendered avatar of a subject person featured in a video 1002 is shown. In this embodiment, user 1014 is watching video 1002 featuring a subject person. According to the techniques of the example embodiments described herein, at any time during scenario 1000, user 1014 may request to start an interactive session with an interactive digitally rendered avatar of the subject person featured in video 1002. For example, at a first time 1004 in video 1002 (e.g., at the 35 second mark of video 1002), user 1014 may start an interactive session with an interactive avatar 1016 of the subject person shown in video 1002 (i.e., shown at first time 1004, the 35 second mark, when user 1014 makes the request).

In this embodiment, user 1014 may continue to interact with interactive avatar 1016 during the interactive session for a period of time. For example, in scenario 1000 shown in FIG. 10, the interactive session between user 1014 and interactive avatar 1016 may last for a first period of time 1018 (e.g., 40 seconds). When the interactive session between user 1014 and interactive avatar 1016 ends after first period of time 1018, user 1014 may rejoin or continue with video 1002 at the corresponding time, such as a third time 1008 (e.g., at the 1 minute, 15 second mark) that has progressed from when user 1014 started the interactive session with interactive avatar 1016 (i.e., 40 seconds after first time 1004, the 35 second mark). The user 1014 may then continue with the remainder of video 1002.

Alternatively, in some embodiments, when the interactive session between user 1014 and interactive avatar 1016 ends after first period of time 1018, user 1014 may return to video 1002 at the next time after the interactive session began. For example, in this embodiment, user 1014 may return to video 1002 at a second time 1006 (e.g., the 36 second mark) that is directly after first time 1004 (e.g., the 35 second mark) when user 1014 made the request. With this arrangement, user 1014 may return back to the point in time of video 1002 from when the interactive session began.

It should be understood that user 1014 may engage in one or more subsequent interactive sessions with interactive avatar 1016 at other points of time in video 1002, including, but not limited to second time 1006, third time 1008, a fourth time 1010, and/or a fifth time 1012. After each interactive session with interactive avatar 1016, user 1014 may choose to return to the departure time in video 1002 or may rejoin video at a time that corresponds to the amount of real time that has progressed during each interactive session (e.g., first period of time 1018, shown in FIG. 10).

Figure 11:
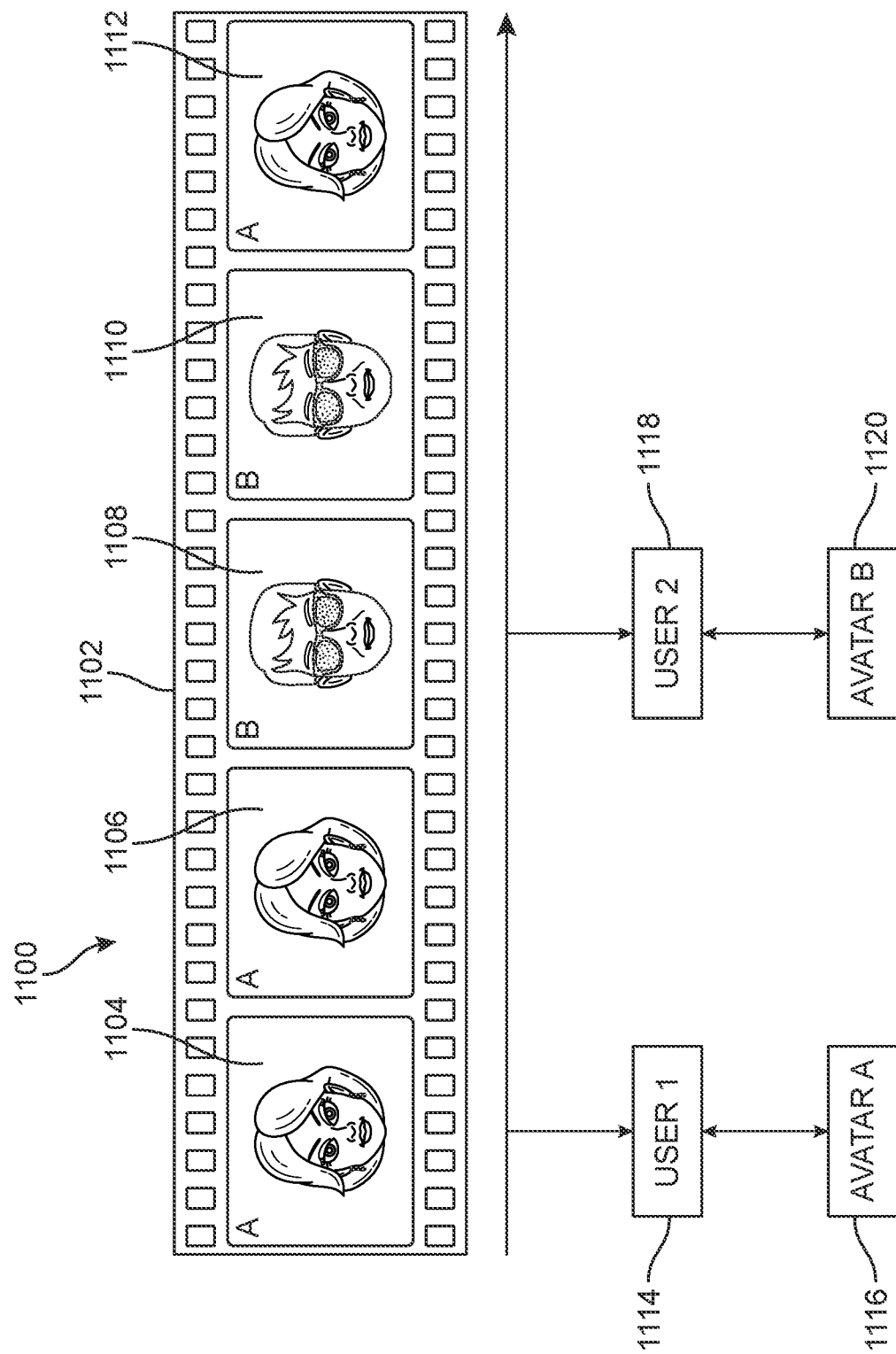
FIG. 11 is a representative view of an example embodiment of users interacting with multiple interactive digitally rendered avatars of different subject people during a video.

Referring now to FIG. 11, a scenario 1100 of an example embodiment of users interacting with multiple interactive digitally rendered avatars of different subject people during a video 1102 is shown. In some embodiments, a video, such as video 1102, may include multiple subject persons, each of which has an associated interactive digital avatar stored in avatar database 116. As shown in scenario 1100 of FIG. 11, video 1102 may include at least two different subject persons, subject person A and subject person B. It should be understood, however, that a video may include any number of subject persons who may have an associated interactive digital avatar in accordance with the example embodiments described herein. For example, the video may be a movie with dozens or more actors and actresses, a sporting event with many different athletes, a panel discussion or presentation with many different speakers or presenters, or any other type of live or prerecorded video with multiple subject persons.

In an example embodiment, during video 1102, one or more users may request to engage in an interactive session with an interactive digital avatar of subject person A, subject person B, or both. For example, in this embodiment, video 1102 at various times will feature or depict one or both of subject person A and subject person B. As shown in scenario 1100, subject person A is shown at a first time 1104 of video 1102, as well as at a second time 1106, and a fifth time 1112. Subject person B, who is a different subject person than subject person A, is shown at a third time 1108 and a fourth time 1110 of video 1102. It should be understood that additional subject persons may also be shown at various times of video 1102.

According to the techniques of the example embodiments described herein, a user of system 100 may request to initiate an interactive session with an interactive digital avatar of the subject person shown at any corresponding time during video 1102. For example, in scenario 1100, a first user 1114 is shown engaging in an interactive session with a first interactive avatar 1116 of subject person A by making the request during first time 1104 of video 1002 (i.e., when subject person A is featured or depicted). Meanwhile, a second user 1118 in scenario 1100 is also shown engaging in an interactive session with a second interactive avatar 1120 of subject person B by making the request during third time 1108 of video 1002 (i.e., when subject person B is featured or depicted). With this arrangement, two different users (e.g., first user 1114 and second user 1118) watching the same video (e.g., video 1102) may interact with different interactive digital avatars (e.g., first interactive avatar 1116 and second interactive avatar 1120) for different subject persons (e.g., subject person A and subject person B).

In the example embodiments described above, the interactive digital avatar was of a subject person that is a celebrity or other notable person. In some embodiments, system 100 and the associated method described herein may also be used to provide an interactive digital avatar of other types of subject persons or for other scenarios. For example, the techniques described herein may be used for any type of group presentations or other situations, including, but not limited to lectures, work or business presentations, school lessons, political town hall meetings, exercise or training classes, or other scenarios involving one or more subject persons interacting with a plurality of people through video (including broadcast, live streaming, pre-recorded, etc.). In these embodiments, the techniques described herein may be used to provide an interactive digital avatar of the subject person or subject persons to allow the plurality of people to individually interact with the interactive digital avatar in their own personalized interactive sessions.

Figure 12:
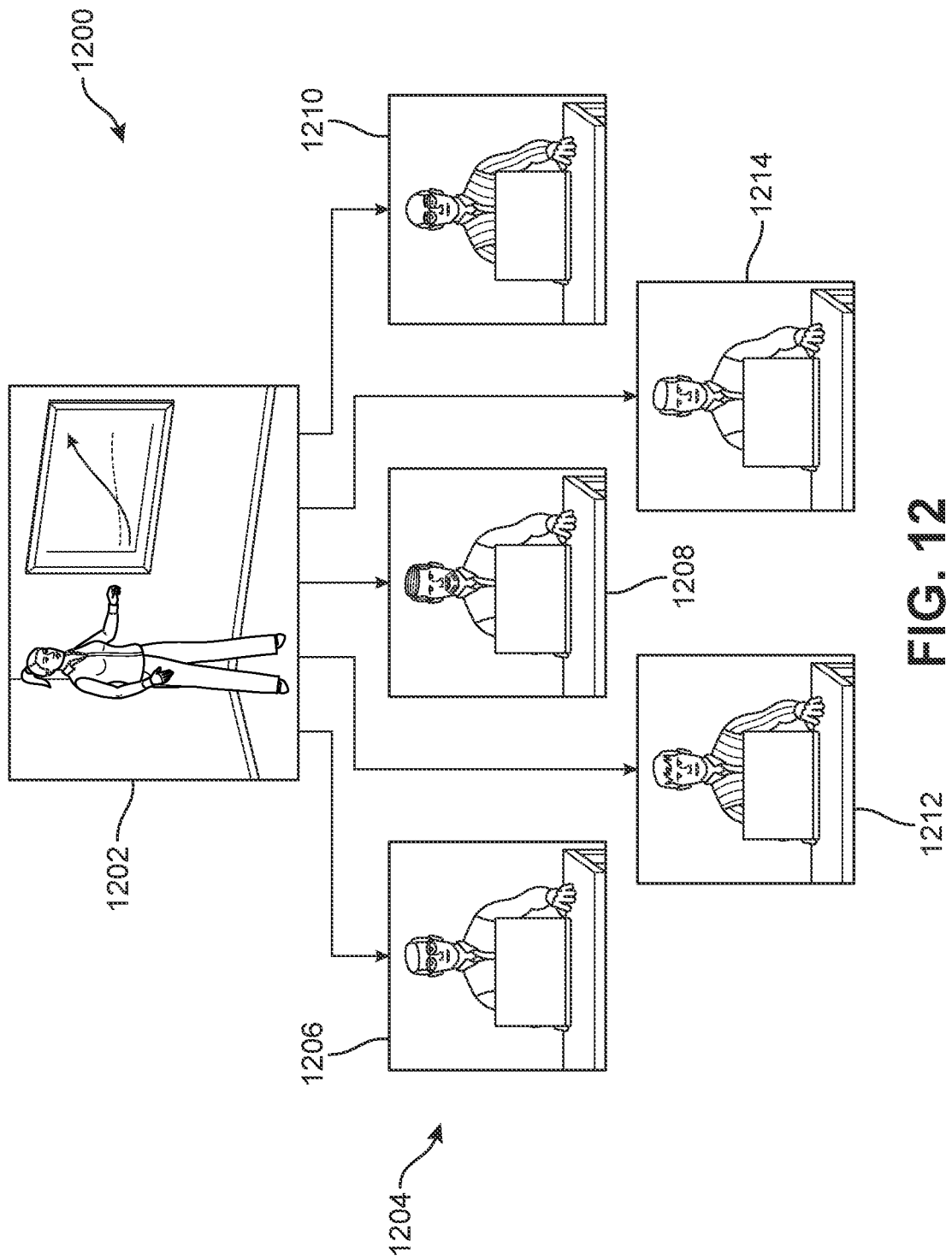
FIG. 12 is a representative view of an alternate embodiment of a subject person providing a group presentation to a plurality of users.
Figure 13:
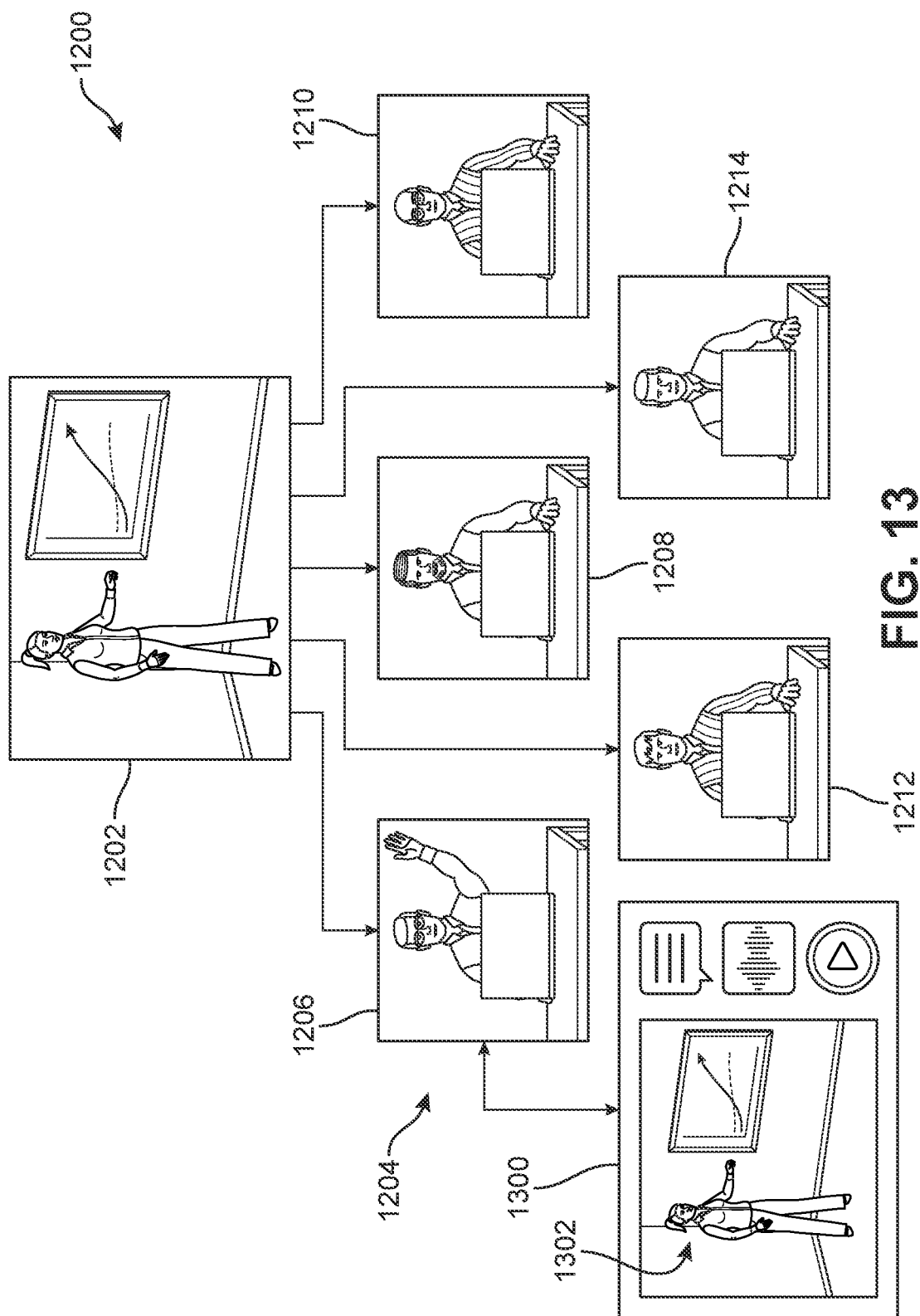
FIG. 13 is a representative view of an alternate embodiment of providing an interactive digitally rendered avatar of a subject person to a user for a group presentation.
Figure 14:
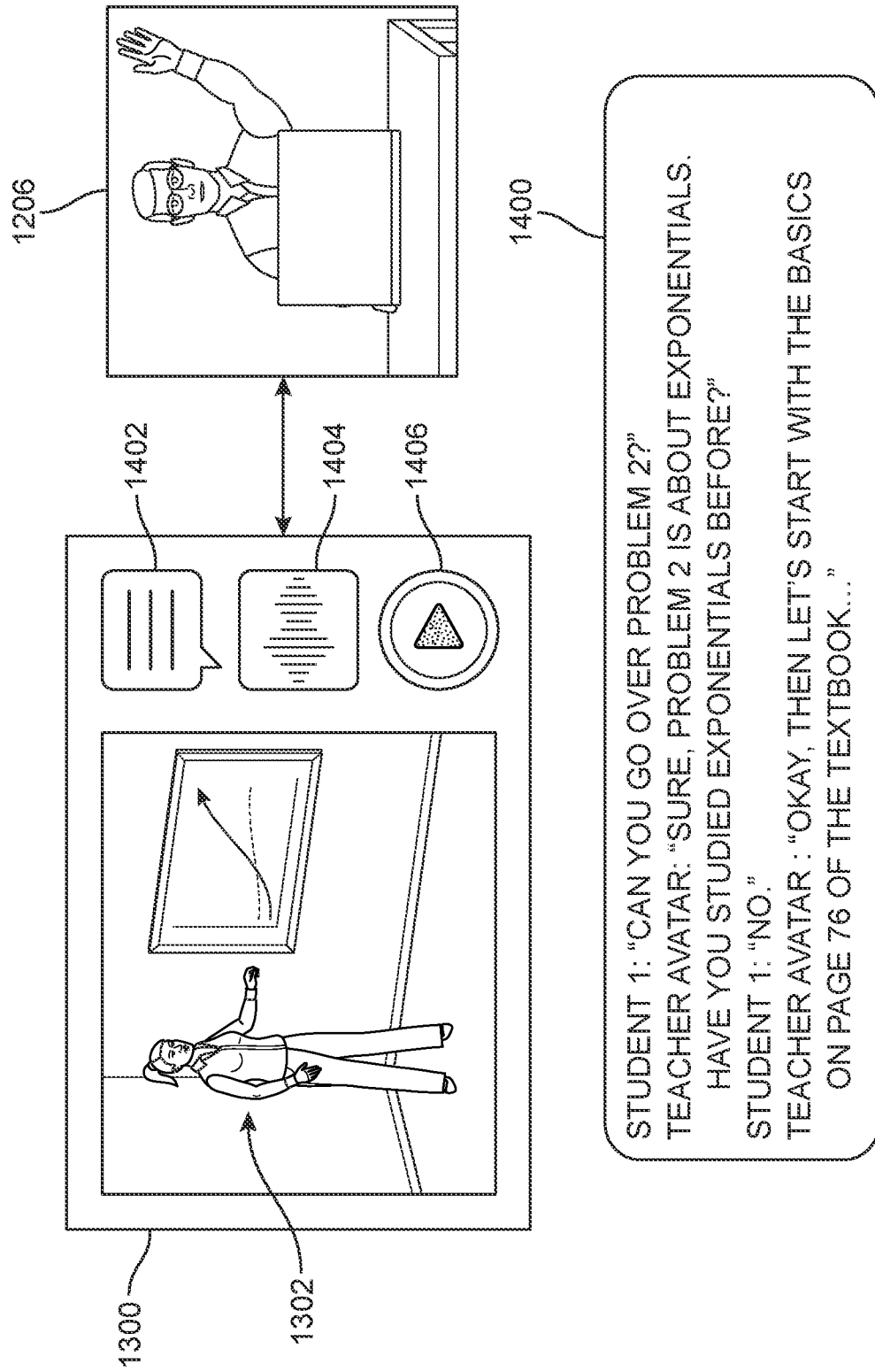
FIG. 14 is a detailed view of an alternate embodiment of an interaction between a user and an interactive digitally rendered avatar of a subject person for a group presentation.

FIGS. 12 through 14 below illustrate an alternate embodiment of using system 100 to provide an interactive digital avatar of a subject person in a group presentation or similar situation. Referring now to FIG. 12, a scenario 1200 of a subject person 1202 providing a group presentation to a plurality of users 1204 is shown. In this embodiment, scenario 1200 may be a lecture or lesson given by subject person 1202, who may be a professor or teacher, to plurality of users 1204, who may be students or pupils of subject person 1202.

In an example embodiment of scenario 1200, the lecture or lesson by subject person 1202 may be provided via a first communication format, such as a live or pre-recorded video that is broadcast or streamed to each user of plurality of users 1204, including a first user 1206, a second user 1208, a third user 1210, a fourth user 1212, and/or a fifth user 1214. As described above, at any time during the lecture or lesson by subject person 1202, one or more users of plurality of users 1204 may send or transmit a request to system 100 to initiate an interactive session with an avatar of subject person 1202 (e.g., as part of operation 604 of method 600, described above).

In some embodiments, system 100 may use input from user interface 500, such as one or more of gestures, facial expressions, or body language of a user captured by camera 508 and/or microphone 510 of user interface 500. For example, system 100 may use this input to analyze facial expressions of a user to determine that the user looks confused or distracted. In another example, system 100 may use the input to detect other types of gestures or actions, such as a user raising a hand or making other motions.

Referring now to FIG. 13, scenario 1200 is shown including an interactive digitally rendered avatar 1302 of subject person 1202 interacting with a first user 1206. In an example embodiment, subject person 1202 has an associated data collection stored in avatar database 116 of system 100 for an interactive digital avatar of subject person 1202. For example, the data collection stored in avatar database 116 may include one or more of audio data, video data, image data, or text data associated with subject person 1202 that allows AI engine 102 to generate an interactive digital avatar of subject person 1202, as described above. In scenario 1200, subject person 1202 is a teacher or professor and the data collection stored in avatar database 116 may include previous recorded lectures or lessons, as well as books, papers, presentations, etc. by subject person 1202.

According to the example embodiments, plurality of users 1204 may be located at different locations and may be using different devices (e.g., one or more types of user interfaces 500) to watch the video featuring subject person 1202. In an example embodiment, when at least one user of plurality of users 1204 would like to interact with a digital avatar of subject person 1202 during the video, that user may send or transmit a request to system 100 to initiate an interactive session with an avatar of subject person 1202 (e.g., as part of operation 604 of method 600, described above).

In this embodiment, first user 1206 has made a request to start an interactive session with a digital avatar of subject person 1202. In some embodiments, first user 1206 may initiate the interactive session through their user interface (e.g., one of user interfaces 500, described above) or system 100 may detect facial expressions or gestures made by first user 1206 that indicate that first user 1206 would like to initiate an interactive session. For example, in this embodiment, first user 1206 has raised his hand, which gesture or motion may be detected by system 100 using camera 508 of user interface 500, to request to start the interactive session with a digital avatar of subject person 1202.

In response, system 100 generates and renders interactive avatar 1302 through an avatar interface 1300 to allow first user 1206 to interact with interactive avatar 1302 of subject person 1202. In contrast to the video from subject person 1202 to plurality of users 1204 (which may be a one-way communication, such as a broadcast or stream), the interactive session between first user 1206 and interactive avatar 1302 is a two-way communication that allows text, audio, and/or video to be transmitted and received in a bi-directional manner between first user 1206 and interactive avatar 1302. For example, in one embodiment, the two-way communication between first user 1206 and interactive avatar 1302 may be provided through avatar interface 1300 and at least one user interface 500 associated with first user 1206 (e.g., a laptop computer in scenario 1200).

Additionally, any of the other users of plurality of users 1204 may also separately, simultaneously, or concurrently request to start their own interactive session with a digital avatar of subject person 1202. In response to each such request, system 100 may generate and render additional instances of interactive digital avatars of subject person 1202 to interact with each additional user making a request, as described above in reference to the example embodiments.

Referring now to FIG. 14, a detailed view of an example embodiment of an interaction between a user and an interactive digitally rendered avatar of a subject person is shown. In this embodiment, a representative interactive session 1400 between first user 1206 and interactive avatar 1302 of subject person 1202 is shown. In an example embodiment, communication during interactive session 1400 between interactive avatar 1302 and first user 1206 may be made through avatar interface 1300 which may be provided on at least one type of user interface 500 associated with first user 1206. In this embodiment, avatar interface 1300 includes one or more of text 1402, audio 1404, and video 1406 options for first user 1206 to interact with interactive avatar 1302.

For example, first user 1206 may engage with interactive avatar 1302 via text 1402 by typing on a keyboard or touchscreen input associated with user interface 500, via audio 1404 by speaking into a microphone or other audio sensor associated with user interface 500 to capture spoken words or input by first user 1206, and/or via video 1406 by using a video camera or other recording device associated with user interface 500 to allow first user 1206 to speak and interact with interactive avatar 1302 during interactive session 1400.

In various embodiments, interactive session 1400 between first user 1206 and interactive avatar 1302 of subject person 1202 may include any discussion of topics or interests that first user 1206 would like to discuss. For example, in this embodiment of interactive session 1400, first user 1206 may interact with interactive avatar 1302 of subject person 1202 to ask questions about the lecture or lesson provided by subject person 1202 on the video. As shown in FIG. 14, first user 1206 has asked interactive avatar 1302 "Can you go over Problem 2?" to which interactive avatar 1302 (e.g., "Teacher Avatar" response in FIG. 14) has responded "Sure, Problem 2 is about Exponentials. Have you studied Exponentials before?" That is, the potential responses or interactions by interactive avatar 1302 with first user 1206 may be shaped or based on an ascertained skill level of first user 1206. In some embodiments, the skill level of first user 1206 may also be stored in the user file for first user 1206 stored in user database 118. For example, the user file may include the student's history, test results, grades, indicate previous classes attended, grades for other courses, etc. so that interactive avatar 1302 may determine the skill level of first user 1206 and base its responses on the skill level of first user 1206.

In this embodiment, first user 1206 responds "No" and, based on this response, interactive avatar 1302 responds "Okay, then let's start with the basics on page 76 of the textbook . . . " That is, in this example of interactive session 1400, interactive avatar 1302 has determined the skill level of first user 1206 (e.g., based on the response to the question of whether first user 1206 had studied exponentials before) and has shaped or based its response (e.g., "then let's start with the basics on page 76 of the textbook") on the ascertained skill level in order to personalize or customize interactive session 1400 to the particular situation of first user 1206.

As described in previous embodiments, the information or data used to generate the responses by interactive avatar 1302 during interactive session 1400 may be obtained from the data collection associated with the avatar stored in avatar database 116, described above. For example, the data collection may include at least one instance of text, audio, video, or image data where subject person 1202 has previously taught or given assistance with the subject of exponentials. Accordingly, system 100 may retrieve this information from avatar database 116 in order to allow interactive avatar 1302 of subject person 1202 to answer questions and provide help to first user 1206.

Additionally, as described above, in some embodiments, the topics, responses, and other information provided during interactive session 1400 between first user 1206 and interactive avatar 1302 of subject person 1202 may be stored in the user file for first user 1206 (e.g., as interaction data 314) and may also be provided back to subject person 1202. For example, subject person 1202 may use the information about one or more interactions between plurality of users 1204 and interactive avatars to identify users that need further assistance with certain topics or to identify areas of the lecture or lesson that are difficult for many users of plurality of users 1204 to understand. That is, by monitoring or analyzing the interactions between plurality of users 1204 and interactive avatars, subject person 1202 may use this feedback to modify or improve her lecture or lesson.

In some embodiments, interactive digitally rendered avatar system 100 (e.g., system 100) may be configured to generate and render an interactive digital avatar of a subject person to participate in one or more web meetings with a plurality of participants. For example, many different video conferencing platforms have been developed that allow a plurality of participants to engage in an online or web meeting. Some examples include, but are not limited to Zoom, Microsoft Teams, Webex, and Google Hangouts, among others, as well as any other hardware or software application that offers video conferencing capabilities for online or web meetings for participants to engage with each other. In some embodiments, a video conferencing platform may be provided through system 100. The techniques described herein allow system 100 to generate an interactive digital avatar of a subject person that can participate in online or web meetings through any one or more of these video conferencing platforms to engage with other participants.

Figure 15:
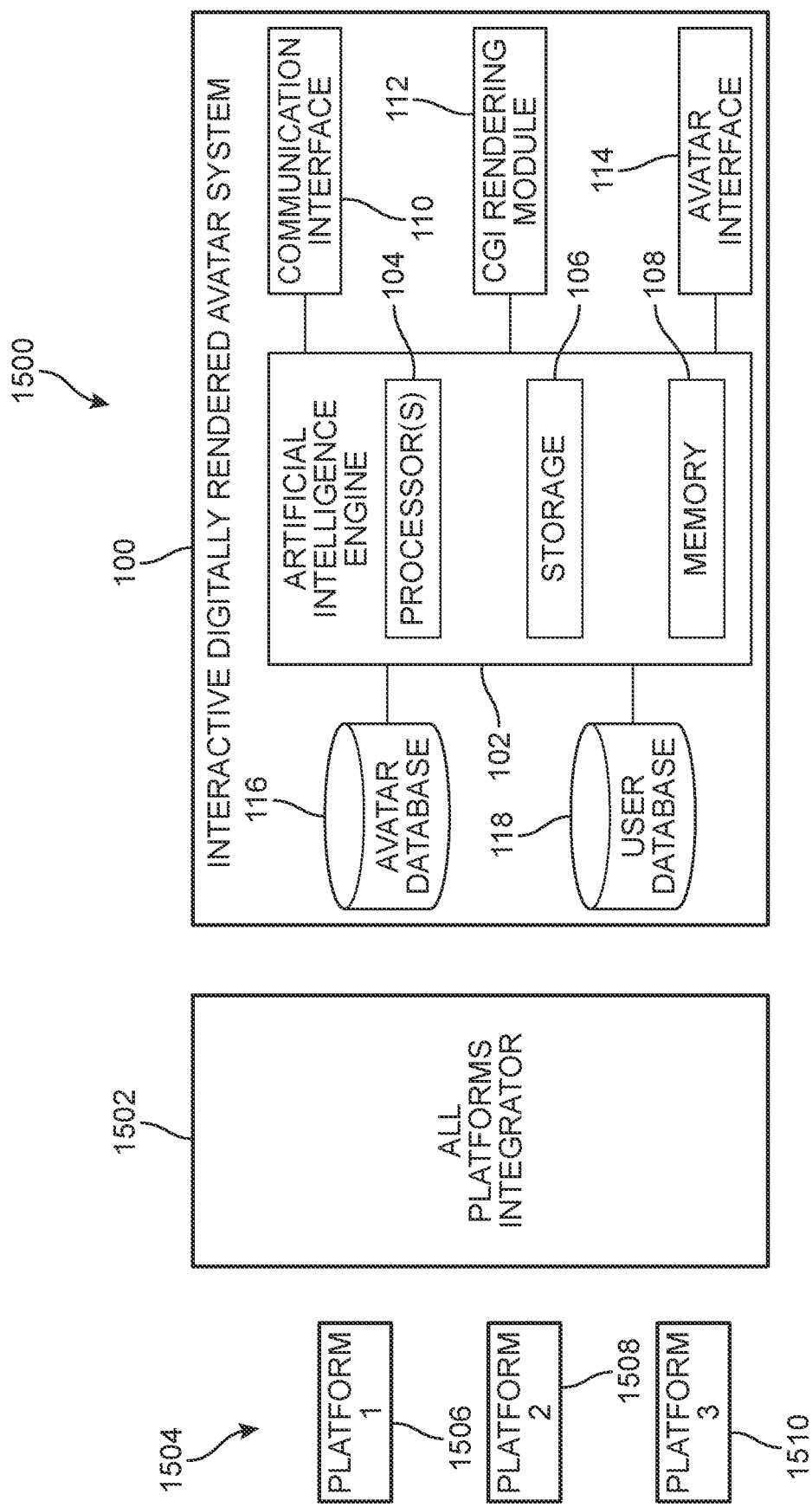
FIG. 15 is a block diagram of an example embodiment of a system allowing an interactive digitally rendered avatar of a subject person to participate in a web meeting.

Referring now to FIG. 15, a block diagram of an example embodiment of a system 1500 allowing an interactive digitally rendered avatar of a subject person to participate in a web meeting is shown. In some embodiments, system 1500 provides a mechanism to allow interactive digitally rendered avatar system 100 to generate interactive avatars that can interact in an online or web meeting with participants through one or more video conferencing platforms, including any of the video conferencing platforms descried above.

In an example embodiment, system 1500 includes an all platforms integrator 1502. All platforms integrator 1502 acts as an intermediary between one or more of video conferencing platforms and system 100 to ensure that the interactive avatar generated by system 100 may function with and participate in an online or web meeting through various video conferencing platforms. For example, each specific video conferencing platform may have protocols and formatting requirements, such as data protocols, security protocols, and video, audio, and text formats, that vary between each platform. All platforms integrator 1502 is configured to transform outputs and inputs between system 100 and one or more video conferencing platforms to the appropriate protocols and formatting so that system 100 and the video conferencing platforms may function with each other.

In some embodiments, all platforms integrator 1502 may store or have access to information with the required protocols and formatting for a plurality of video conferencing platforms 1504, as well as any other information that may be needed from a specific platform to participate in a web meeting or online meeting (e.g., device information, usernames and passwords, etc.). In this embodiment, plurality of video conferencing platforms 1504 include at least a first platform 1506, a second platform 1508, and a third platform 1510. All platforms integrator 1502 is configured to handle the transformation of outputs and inputs between system 100 and any one or more of first platform 1506, second platform 1508, and third platform 1510 so that an interactive avatar of a subject person generated by system 100 may participate in a web meeting or online meeting on that platform. In some cases, each of first platform 1506, second platform 1508, and third platform 1510 may be different video conferencing platforms that have different sets of protocols and formatting for engaging in a web meeting or online meeting on that platform.

As shown in FIG. 15, plurality of video conferencing platforms 1504 includes three platforms. In other embodiments, plurality of video conferencing platforms 1504 may include any number of platforms, including currently known platforms as well as new platforms developed in the future. All platforms integrator 1502 may be further configured to obtain and store information associated with the required protocols, formatting, and other information for additional or new platforms so that system 100 may function with these other platforms.

In an example embodiment, all platforms integrator 1502 may be implemented by one or more processors of a computing system or computing device. In some cases, the computing system or computing device implementing all platforms integrator 1502 may separate from the processor(s) associated with system 100 (e.g., processor(s) 104, described above. In other cases, one or more functions of all platforms integrator 1502 may be implemented by components of system 100, including one or more of the processors of the computing system or computing device of system 100 (e.g., processors 104). In still other cases, functions of all platforms integrator 1502 may be implemented by a combination of processors from multiple computing systems or computing devices, including some functions executed by system 100 (e.g., processor(s) 104) and some functions executed by a separate computing system, such as a cloud computing system.

Figure 16:
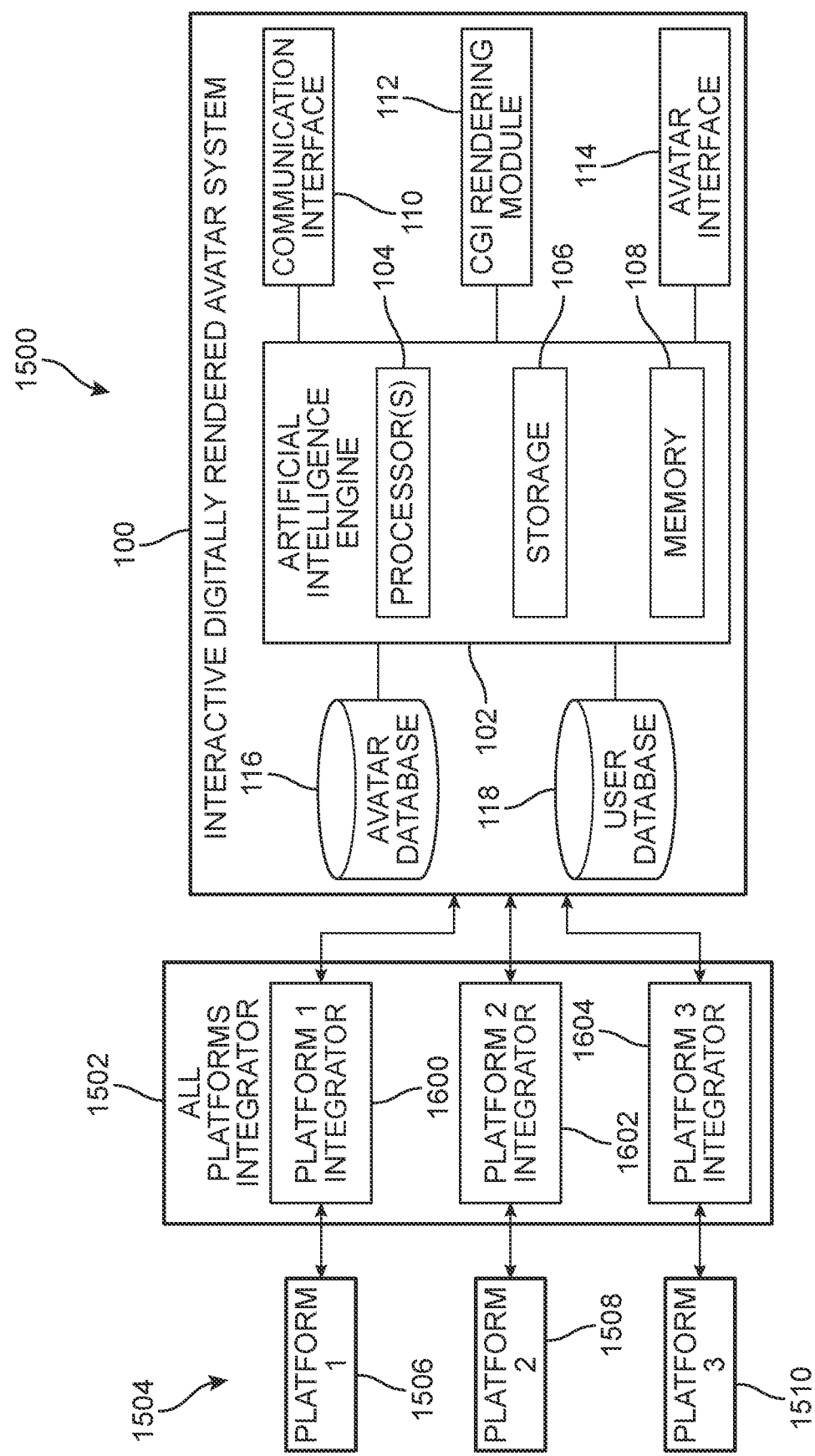
FIG. 16 is a block diagram of an example embodiment of an all platforms integrator enabling an interactive digitally rendered avatar of a subject person to participate in a web meeting.

FIG. 16 is a block diagram of all platforms integrator 1502 enabling an interactive digitally rendered avatar of a subject person generated by system 100 to participate in a web meeting via one or more platforms of plurality of video conferencing platforms 1504. In an example embodiment, all platforms integrator 1502 may instantiate one or more platform-specific integrators that are configured to transform the outputs and inputs between system 100 and the specific video conferencing platform of plurality of video conferencing platforms 1504 with the associated corresponding set of protocols and formatting for engaging in a web meeting or online meeting on that specific platform so that an interactive avatar of a subject person generated by system 100 may participate in a web meeting or online meeting on that platform.

In this embodiment, all platforms integrator 1502 instantiates separate, individual platform integrators that are specific to each particular video conferencing platform. For example, as shown in FIG. 16, all platforms integrator 1502 has instantiated a first platform integrator 1600 associated with first platform 1506, a second platform integrator 1602 associated with second platform 1508, and a third platform integrator 1604 associated with third platform 1510. Each of these separate, individual platform integrators are configured with the specific set of protocols and formatting for engaging in a web meeting or online meeting on a corresponding specific platform so that an interactive avatar of a subject person generated by system 100 may participate in a web meeting or online meeting on that platform.

For example, each platform integrator is configured to transform outputs from system 100 associated with the rendered and generated interactive avatar into simulated audio, video, and/or text that is provided to the video conferencing platform in a format that is compatible with the audio, video, and/or text inputs used to communicate on that platform. That is, because the outputs from system 100 are not generated from actual microphones, video cameras, or keyboards, as they would be in the case of a real-life person participating in a web meeting on a video conferencing platform, the specific platform integrator is configured to simulate the functions of a microphone, video camera, and/or keyboard to transform the outputs from system 100 into a compatible format so that the audio, video, and/or text that is provided to the video conferencing platform from system 100 appears to be from a microphone, video camera, or keyboard.

In this embodiment, first platform integrator 1600 is configured to transform the outputs and inputs between system 100 and first platform 1506 with the associated corresponding set of protocols and formatting associated with first platform 1506. Similarly, second platform integrator 1602 is configured to transform the outputs and inputs between system 100 and second platform 1508 with the associated corresponding set of protocols and formatting associated with second platform 1508 and third platform integrator 1604 is configured to transform the outputs and inputs between system 100 and third platform 1510 with the associated corresponding set of protocols and formatting associated with third platform 1510. With this arrangement, all platforms integrator 1502 may instantiate separate, individual platform integrators for each of first platform 1506, second platform 1508, and third platform 1510 to transform the outputs and inputs between system 100 and each platform using different sets of protocols and formatting for engaging in a web meeting or online meeting on that platform.

Figure 17:
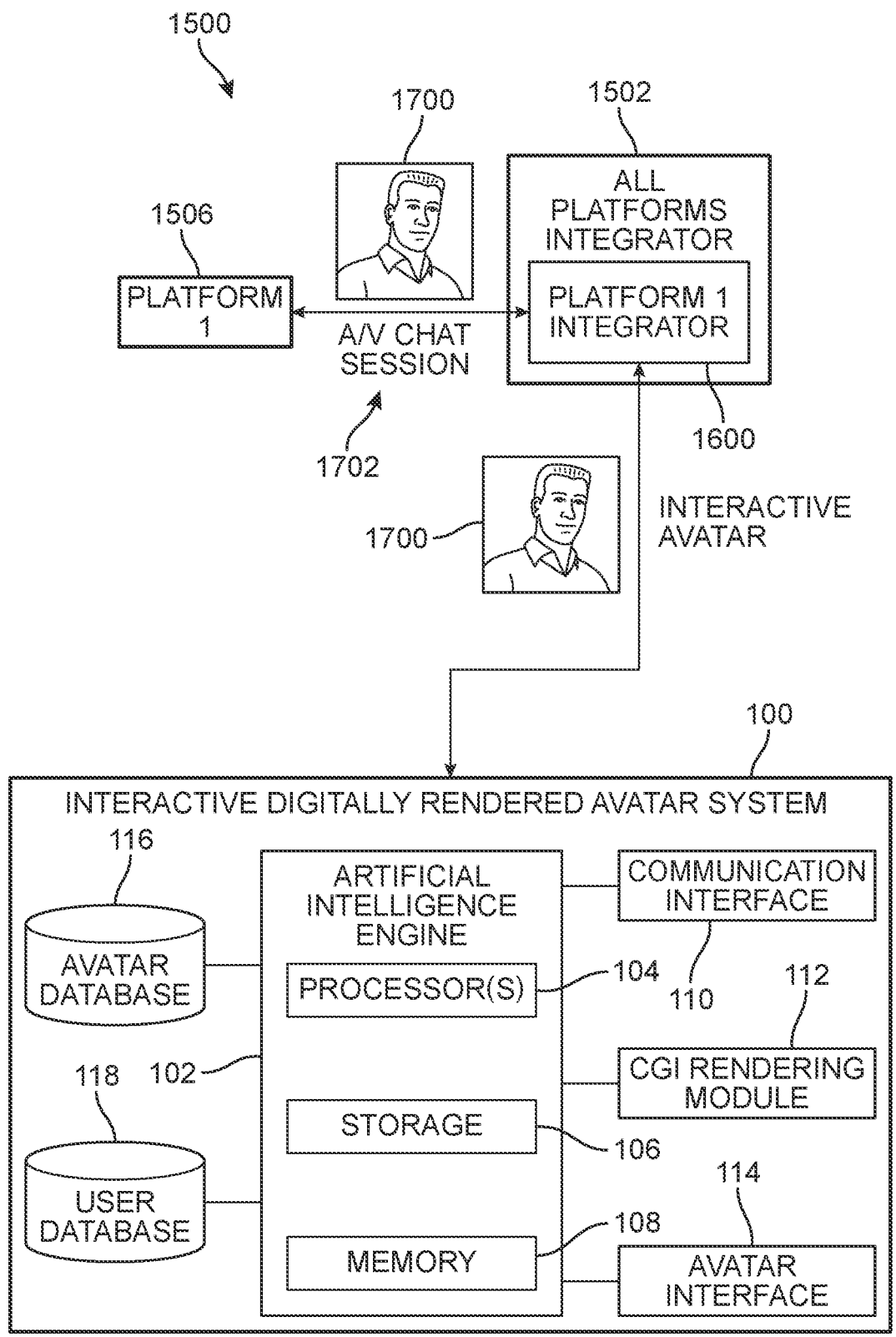
FIG. 17 is a representative view of an example embodiment of an interactive digitally rendered avatar of a subject person participating in a web meeting.

Referring now to FIG. 17, a representative view of an example embodiment of an interactive digitally rendered avatar of a subject person participating in a web meeting is shown. In this embodiment, system 100 generates an interactive avatar 1700 of a subject person, as described above. Interactive avatar 1700 has been invited to a scheduled web meeting or an active web meeting on first platform 1506. In order for interactive avatar 1700 to participate in the web meeting on first platform 1506, all platforms integrator 1502 instantiates first platform integrator 1600. As described above, first platform integrator 1600 transforms the inputs and outputs between system 100 and first platform 1506 so that interactive avatar 1700 may participate in the web meeting as a participant. With this arrangement, interactive avatar 1700 participates in an audio/visual chat session 1702 during a web meeting conducted on first platform 1506 by using first platform integrator 1600 to transform the inputs and outputs between system 100 and first platform 1506 using the specific set of protocols and formatting for engaging in a web meeting on that platform. That is, first platform integrator 1600 allows interactive avatar 1700 to participate in audio/visual chat session 1702 using any combination of audio, video, and text to interact with the other participants in audio/visual chat session 1702, including receiving and recognizing audio, video, and/or text from the other participants.

In some embodiments, one or more participants may begin a web meeting using a video conferencing platform to discuss a topic. During the web meeting or before the web meeting begins, the participants may want to bring in an expert or other subject person that has knowledge or experience about the subject or topic discussed in the web meeting. In these situations, the actual expert or other subject person may not be available to participate in the web meeting. Using the techniques of the present embodiments described herein, an interactive avatar of the subject person may participate in the web meeting and provide responses to the other participants based on the accumulated knowledge of the subject person contained in the subject person's data collection stored in avatar database 116, described above.

Figure 18:
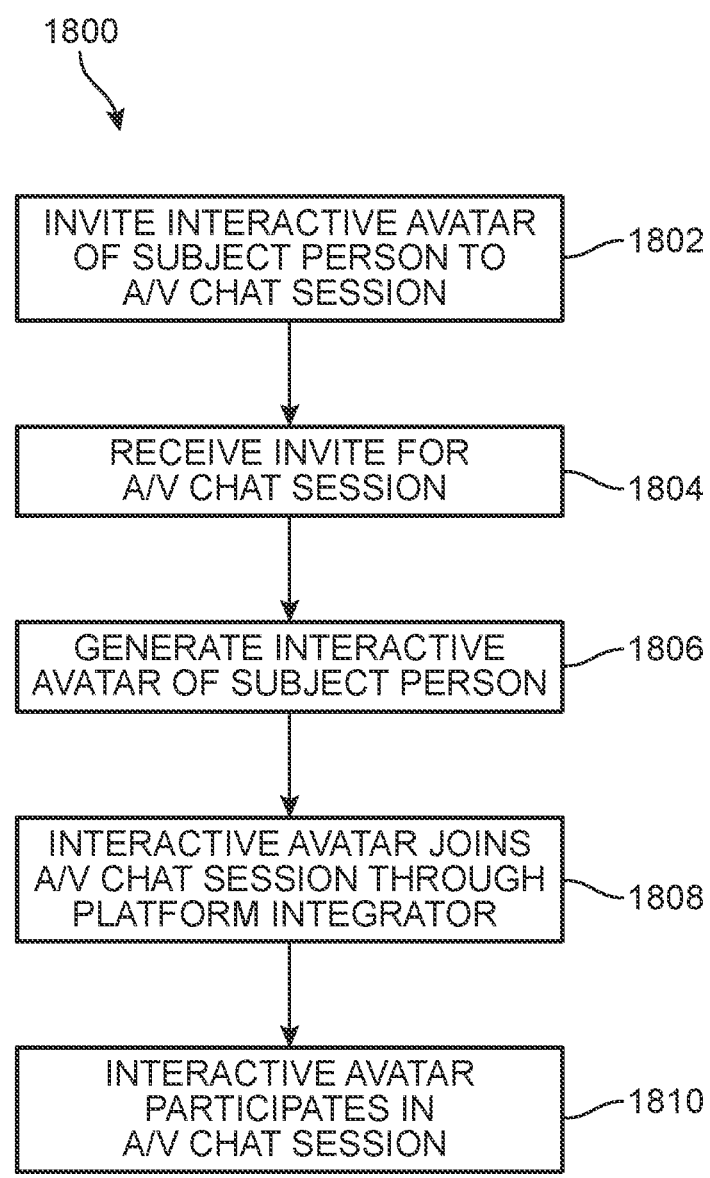
FIG. 18 is a flowchart of an example embodiment of a method for allowing an interactive digitally rendered avatar of a subject person to participate in a web meeting.

FIG. 18 is a flowchart of an example embodiment of a method 1800 for allowing an interactive digitally rendered avatar of a subject person to participate in a web meeting on a video conferencing platform. In an example embodiment, method 1800 may begin at an operation 1802. At operation 1802, an interactive avatar of a subject person is sent an invite to participate in an audio/visual chat session (i.e., a web meeting) conducted on a video conferencing platform. In some cases, operation 1802 may be performed during an on-going or existing web meeting. That is, the interactive avatar may be invited to join into an audio/visual chat session with other participants that has a prior chat history, which may include recorded audio and/or video, as well as recorded or saved text. In other cases, operation 1802 may be performed in advance or prior to the start of a web meeting. That is, the interactive avatar may be invited to join into a new audio/visual chat session with other participants.

Next, at an operation 1804 the invite sent at operation 1802 to join an audio/visual chat session (e.g., web meeting) on a video conferencing platform is received by interactive digitally rendered avatar system 100. In an example embodiment, the invite received by system 100 includes an identifier of the interactive avatar of the subject person that is being invited to join the web meeting. The identifier may refer to the subject person by name, username, or other indicator of identity so that system 100 may match the invite to the information stored in avatar database 116. In some cases, the invite may also include information about the specific video conferencing platform (e.g., one or more of plurality of video conferencing platforms 1504) that the interactive avatar is being invited to join to participate in the audio/visual chat session.

Once system 100 identifies the interactive avatar of the subject person matching the identifier in the invite to an associated data collection in avatar database 116 (e.g., a data collection associated with the subject person), method 1800 includes an operation 1806. At operation 1806, system 100 generates an interactive avatar of the subject person. The interactive avatar generated by system 100 at operation 1806 may be rendered and generated according to the process described above.

Method 1800 further includes an operation 1808. At operation 1808, the interactive avatar of the subject person generated at operation 1806 joins the audio/visual chat session (e.g., web meeting) on the video conferencing platform. In some embodiments, operation 1808 may also include instantiating a specific platform integrator by all platforms integrator 1502 for the video conferencing platform identified by the received invite, as described above, so that the generated interactive avatar may participate in the audio/visual chat session (e.g., web meeting).

Next, method 1800 includes an operation 1810. At operation 1810, the interactive avatar of the subject person participates in the audio/visual chat session (e.g., web meeting) on the video conferencing platform with the other participants. In an example embodiment, the specific platform integrator instantiated by all platforms integrator 1502 transforms the outputs and inputs between system 100 and the video conferencing platform so that the interactive avatar of the subject person can participate in the audio/visual chat session at operation 1810. With this arrangement, method 1800 allows participants of a web meeting to have an interactive avatar of a subject person join the web meeting and provide responses based on the collected knowledge of the subject person and with an image or video of the subject person so that it appears as if the actual subject person is in the web meeting.

Figure 19:
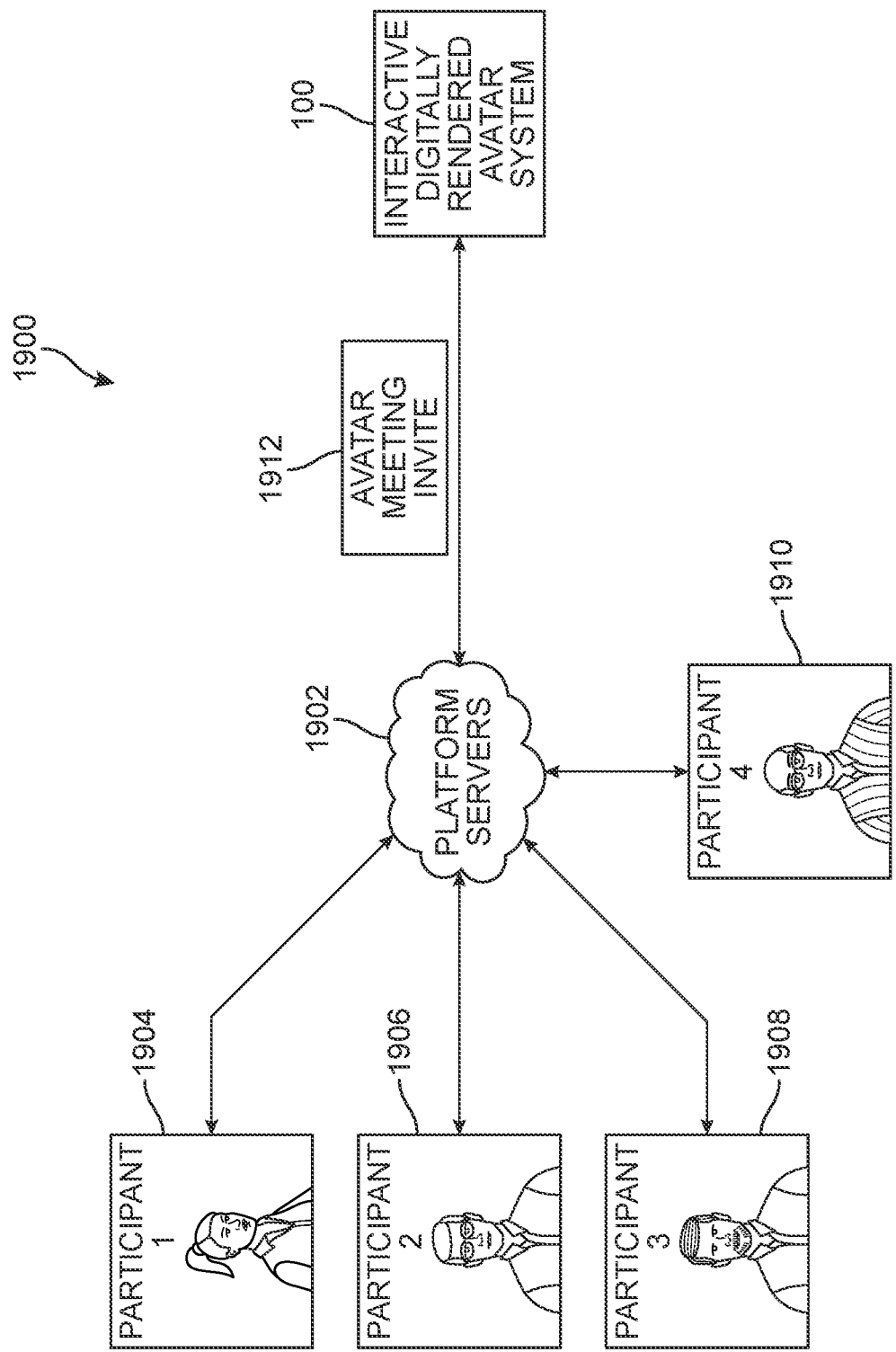
FIG. 19 is a schematic view of an example embodiment of inviting an interactive digitally rendered avatar of a subject person to a web meeting.

Referring now to FIGS. 19-22, a representative web meeting with an interactive avatar of a subject person generated according to the techniques described herein is illustrated. FIG. 19 illustrates an example embodiment of inviting an interactive digitally rendered avatar of a subject person to a web meeting. In this embodiment, a plurality of participants are engaging (or plan to engage) in a web meeting 1900 through platform servers 1902 of a specific video conferencing platform, for example, first platform 1506, described above. In this scenario, the participants of web meeting 1900 include at least a first participant 1904, a second participant 1906, a third participant 1908, and a fourth participant 1910. It should be understood that a web meeting, such as web meeting 1900, may include any number of participants, include more or less than shown in FIG. 19.

According to the example embodiments, the participants of web meeting 1900 may decide to invite an interactive avatar of a subject person to web meeting 1900. As described above, the invite may occur before web meeting 1900 or at any time while web meeting 1900 is already ongoing. In this embodiment, one of the participants of web meeting 1900 sends a meeting invite 1912 to system 100 to request that an interactive avatar of a specific subject person join web meeting 1900. For example, invite 1912 may request an interactive avatar of a specific subject person who is an expert in a topic or subject being discussed in web meeting 1900. Invite 1912 may also identify the specific video conferencing platform (e.g., first platform 1506, in this example) that the interactive avatar is to use to join web meeting 1900.

Figure 20:
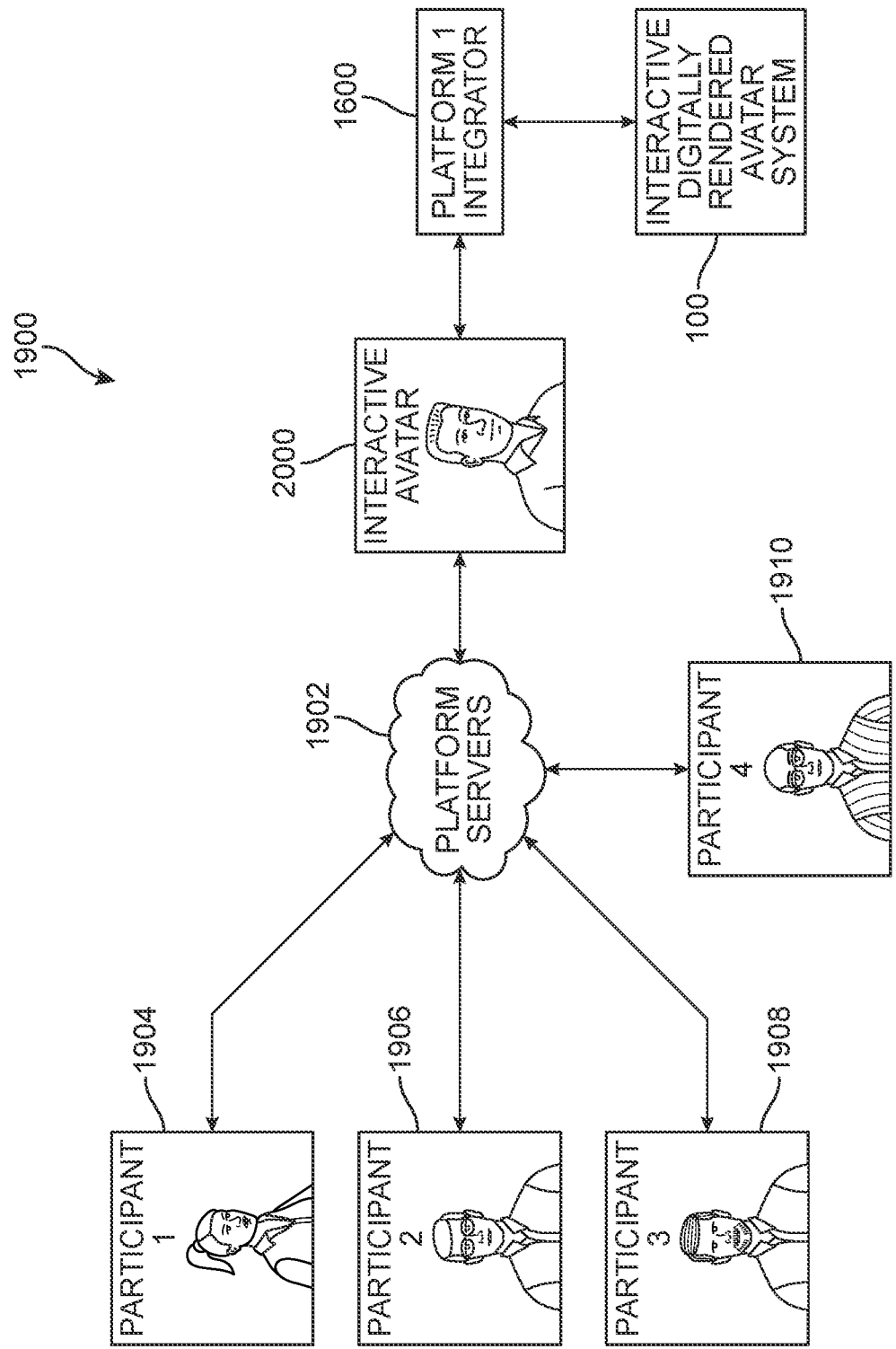
FIG. 20 is a schematic view of an example embodiment of an interactive digitally rendered avatar of a subject person joining a web meeting.

Referring now to FIG. 20, upon receiving meeting invite 1912, system 100 renders and generates an interactive avatar 2000 of the requested specific subject person. All platforms integrator 1502 of system 100 also instantiates first platform integrator 1600 to transform the outputs and inputs between platform servers 1902 of the video conferencing platform (e.g., first platform 1506, in this example) and system 100 so that interactive avatar 2000 may join web meeting 1900. With this arrangement, interactive avatar 2000 may interact with one or more of first participant 1904, second participant 1906, third participant 1908, and fourth participant 1910 and engage in web meeting 1900 as a participant.

Figure 21:
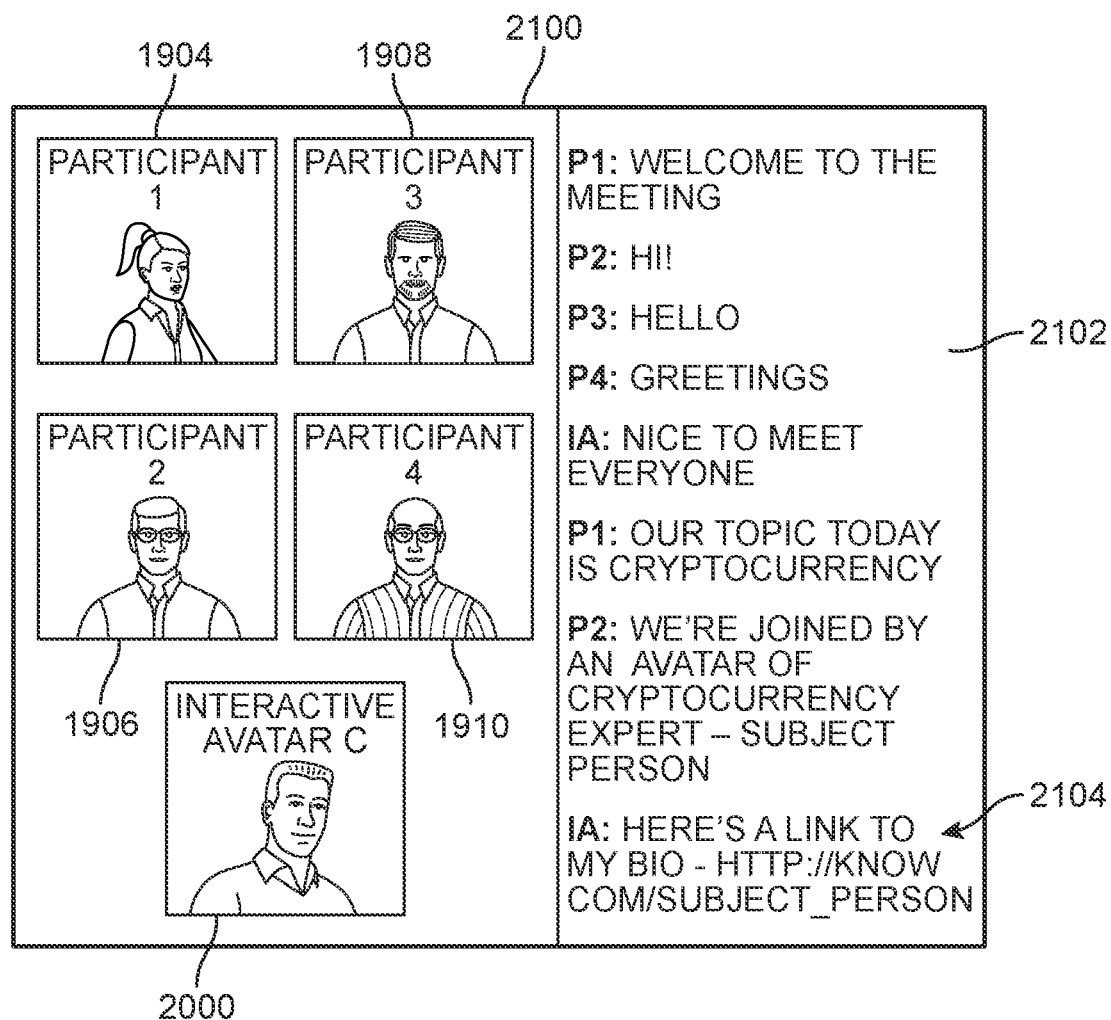
FIG. 21 is a representative view of an example embodiment of a web meeting with an interactive digitally rendered avatar of a subject person participating.

FIG. 21 is a representative view of an example embodiment of an audio/visual chat session of web meeting 1900 with interactive avatar 2000 of a subject person participating. In this embodiment, web meeting 1900 may include an audio/visual chat session 2100 that includes audio, video, and/or text from multiple participants, including one or more of first participant 1904, second participant 1906, third participant 1908, and fourth participant 1910, as well as interactive avatar 2000. As shown in FIG. 21, interactive avatar 2000 may provide audio, video, and text to audio/visual chat session 2100 to contribute to the discussion of web meeting 1900. In some embodiments, an in-meeting text chat 2102 during audio/visual chat session 2100 may include responses or questions from the various participants (1904, 1906, 1908, 1910) and interactive avatar 2000.

In some cases, interactive avatar 2000 may introduce itself in text chat 2102 by way of a biographical link 2104 that includes details about the subject person associated with interactive avatar 2000, including their area of expertise or background. For example, in this scenario interactive avatar 2000 is an interactive avatar of a subject person who is an expert in the topic of cryptocurrency, in which case biographical link 2104 provided by interactive avatar 2000 may include background information, credentials, areas of expertise, etc. of the cryptocurrency expert whose avatar is rendered and generated as interactive avatar 2000. System 100 is configured to answer questions and provide responses by interactive avatar 2000 based on the accumulated knowledge of the subject person stored in the data collection of avatar database 116, described above. In some cases, interactive avatar 2000 may offer to share saved presentations, articles, videos, speeches, etc. of the subject person that are stored within the data collection of the subject person in avatar database 116. With this arrangement, the participants of web meeting 1900 may engage in audio/visual chat session 2100 with interactive avatar 2000 to ask questions or otherwise discuss the topic of cryptocurrency (or any other topic, depending on the selected avatar) with an expert in the topic, without needing the participation of the real, live subject person.

Often times a web meeting (e.g., web meeting 1900) may include discussions of a variety of different topics and subjects. In some embodiments, an interactive avatar according to the techniques described herein may recognize when a topic or subject being discussed during a web meeting deviates outside of its knowledge base (e.g., no information associated with the topic being discussed in available in the data collection of the subject person in avatar database 116).

Figure 22:
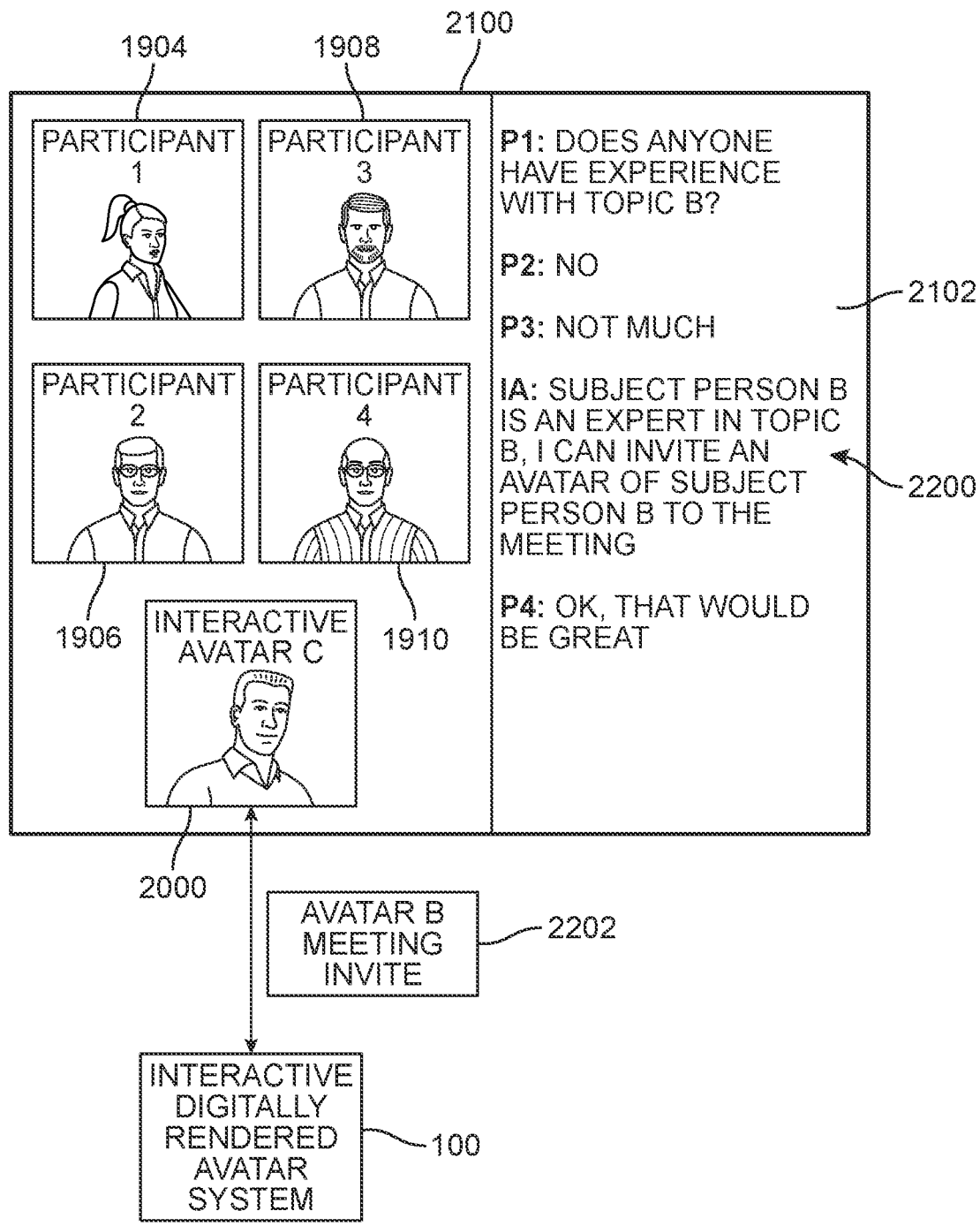
FIG. 22 is a representative view of an example embodiment of an interactive digitally rendered avatar of a subject person in a web meeting inviting another avatar to the web meeting.

For example, referring now to FIG. 22, the topic being discussed during audio/visual chat session 2100 of web meeting 1900 may switch from cryptocurrency to another topic (e.g., topic B). As shown in FIG. 22, interactive avatar 2000 may recognize this switch or change in topic and determine that the new topic (e.g., topic B) is outside of the information stored in the data collection for the subject person who is a cryptocurrency expert in avatar database 116. In response to this recognition, interactive avatar 2000 may inquire to the other participants (1904, 1906, 1908, 1910) whether or not they would like an interactive avatar of a new subject person who is an expert in the new topic (e.g., topic B) to be invited to web meeting 1900. For example, as shown in FIG. 22, interactive avatar 2000 may generate a text request 2200 in text chat 2102 during audio/visual chat session 2100 asking if an interactive avatar of subject person B should be invited.

Upon receiving confirmation from one or more participants in audio/visual chat session 2100 of web meeting 1900 to invite the interactive avatar of subject person B, interactive avatar 2000 may send a meeting invite 2202 for the interactive avatar of subject person B to system 100. In response, system 100 may render and generate an interactive avatar of subject person B to join and participate in audio/visual chat session 2100, in a substantially similar manner as described above for generating interactive avatar 2000. It should be understood that system 100 may render and generate any number of interactive avatars that may join and participate in a web meeting together or alone.

In some cases, interactive avatar 2000 and/or system 100 may suggest or recommend an interactive avatar of a subject person based on the topics or subjects being discussed during an audio/visual chat session of a web meeting. For example, by matching and/or ranking key words recognized through audio, video, or text from the various participants. In other cases, system 100 may associate a default interactive avatar of a subject person with a particular topic. In still other cases, system 100 may provide a list of two or more interactive avatars of subject person who have matching or similar areas of expertise based on the topics or subjects being discussed.

In some cases, participants of a web meeting may not know the name of a specific subject person who is an expert in a given topic or subject that is being discussed during the meeting. In some embodiments, system 100 may provide an avatar concierge that is configured to make recommendations for one or more interactive avatars of subject person(s) to participate in the web meeting. In some cases, the recommendation may be made based on recognition and analysis of the topics or subjects discussed in the audio/visual chat session, including audio recordings, video recordings, and/or text history, of the web meeting. In other cases, the recommendation may be made using a guided selection process where the avatar concierge asks the participants questions to determine an appropriate interactive avatar of a subject person based on the participant's answers to the questions about topics or subjects to be discussed during the web meeting.

Figure 23:
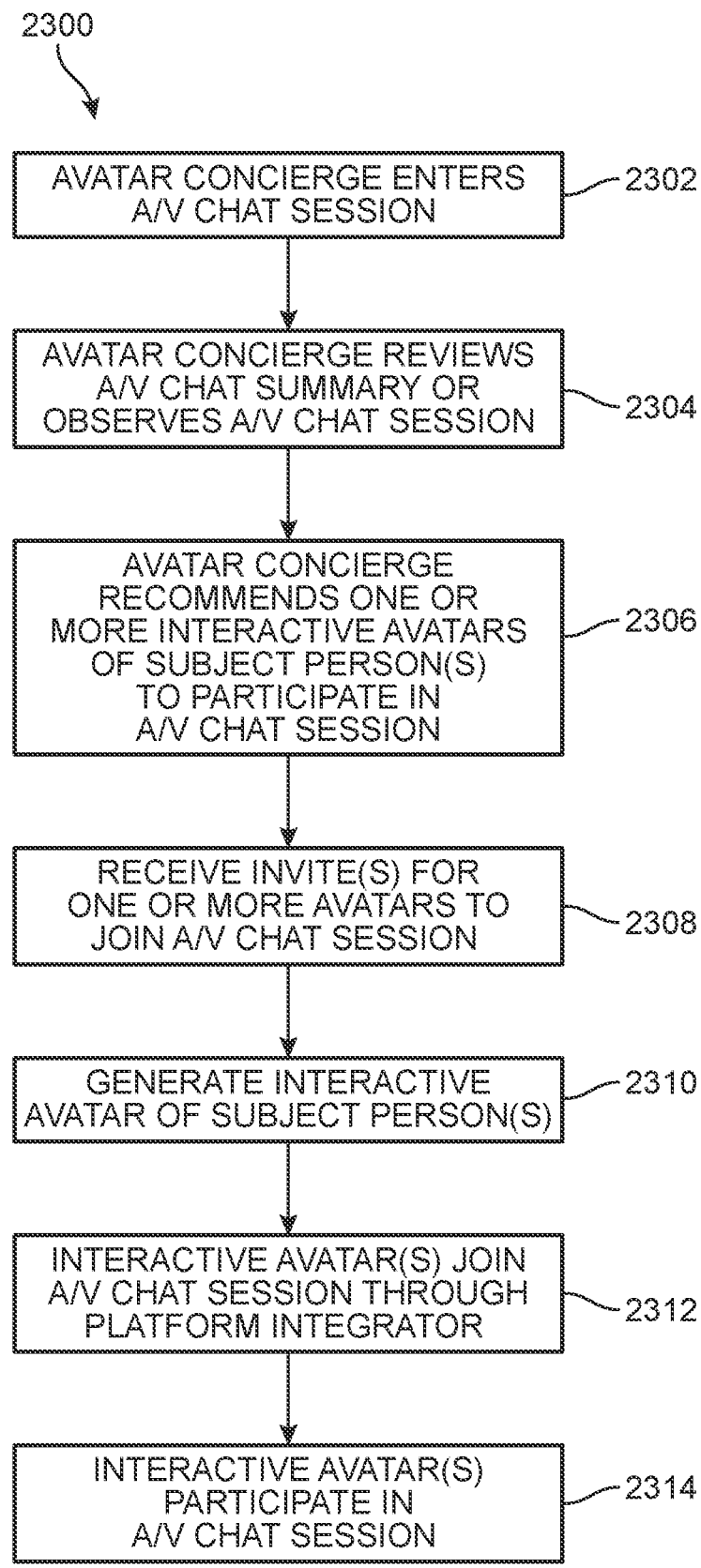
FIG. 23 is a flowchart of an example embodiment of a method for selecting an interactive digitally rendered avatar of a subject person to participate in a web meeting.

Referring now to FIG. 23, a flowchart of an example embodiment of a method 2300 for selecting an interactive digitally rendered avatar of a subject person to participate in a web meeting is shown. In an example embodiment, method 2300 may begin at an operation 2302. At operation 2302, an avatar concierge enters an audio/visual chat session (i.e., a web meeting) conducted on a video conferencing platform. In some cases, operation 2302 may be performed while an on-going or existing web meeting is already occurring. That is, the avatar concierge may be invited to join into an audio/visual chat session with other participants that has a prior chat history, which may include recorded audio and/or video, as well as recorded or saved text. In other cases, operation 2302 may be performed in advance or prior to the start of a web meeting so that the avatar concierge may observe a new audio/visual chat session with other participants.

Next, method 2300 includes an operation 2304. At operation 2304, the avatar concierge reviews the audio/visual chat summary (i.e., the prior chat history before the avatar concierge entered the web meeting) and/or observes the audio/visual chat session. For example, in the case where operation 2302 is performed during an on-going or existing web meeting, the avatar concierge may review the prior chat history and analyze the topics and subjects being discussed by the other participants via text, audio, and video. In this situation, the avatar concierge may also observe the topics and subjects being discussed by the other participants after the avatar concierge enters the web meeting to obtain additional information to make a recommendation. In the case where operation 2302 is performed prior to or at the start of the web meeting, the avatar concierge may observe the topics and subjects being discussed by the other participants via text, audio, and video for a predetermined time to gather information to make a recommendation.

Upon review of the topics and subjects being discussed by the other participants at operation 2304, method 2300 proceeds to an operation 2306. At operation 2306, the avatar concierge recommends one or more interactive avatars of subject person(s) to participate in the audio/visual chat session with the other participants. For example, at operation 2306 the avatar concierge may recommend an interactive avatar of a subject person based on the topics and subjects reviewed and analyzed during the audio/visual chat session. In some cases, system 100 may have keywords or subject matter tags associated with various subject persons who have data collections stored in avatar database 116 for generating interactive avatars of those subject persons. The avatar concierge may then match the topics and subjects discussed during the audio/visual chat session to the keywords or subject matter tags associated with the various subject persons make a recommendation of an interactive avatar of a subject person who is an expert or has experience in the topics and subjects being discussed.

In some cases, at operation 2306 the avatar concierge may offer the participants to select an interactive avatar of a subject person from multiple recommended avatars. In other cases, at operation 2306 the avatar concierge may recommend an interactive avatar of a subject person that has the highest match to the topics or subjects being discussed. In still other cases, at operation 2306 the avatar concierge may recommend multiple interactive avatars of subject persons, with each interactive avatar being associated with a subject person having an expertise or experience in a different topic being discussed during the audio/visual chat session.

Next, method 2308 proceeds to an operation 2308. At operation 2308, system 100 receives an invite for one or more interactive avatars of subject person(s) to join the audio/visual chat session. For example, at operation 2308, the avatar concierge may send invites to system 100 for the one or more interactive avatars of subject person(s) recommended at operation 2306. As described above, the invites received by system 100 from the avatar concierge at operation 2308 may include an identifier of the one or more subject person(s) whose interactive avatars are invited and information about the video conferencing platform that is being used to conduct the web meeting.

In response to receiving the invite(s) at operation 2308, method 2300 further includes an operation 2310. At operation 2310, system 100 renders and generates the one or more interactive avatars of subject person(s) for which the invites were received. In an example embodiment, system 100 renders and generates the interactive avatars according to the process described above. Once the one or more interactive avatars are rendered and generated at operation 2310, method 2300 includes an operation 2312 where the one or more interactive avatars join the audio/visual chat session. In an example embodiment, operation 2312 includes all platforms integrator 1502 instantiating a specific platform integrator for the video conferencing platform being used to conduct the web meeting. For example, as described above, the invite(s) received by system 100 may include information about the specific video conferencing platform being used so that all platforms integrator 1502 may instantiate a platform integrator for that platform to transform the outputs and inputs between system 100 and the platform so the interactive avatar can participate in the audio/visual chat session at an operation 2314.

With this arrangement, method 2300 allows participants of a web meeting to have an avatar concierge recommend an interactive avatar of a subject person to join the web meeting based on the topics and subjects being discussed. The interactive avatar can join the web meeting provide responses based on the collected knowledge of the subject person about the topics or subjects and with an image or video of the subject person so that it appears as if the actual subject person is in the web meeting sharing their expertise and experience with the other participants.

Figure 24:
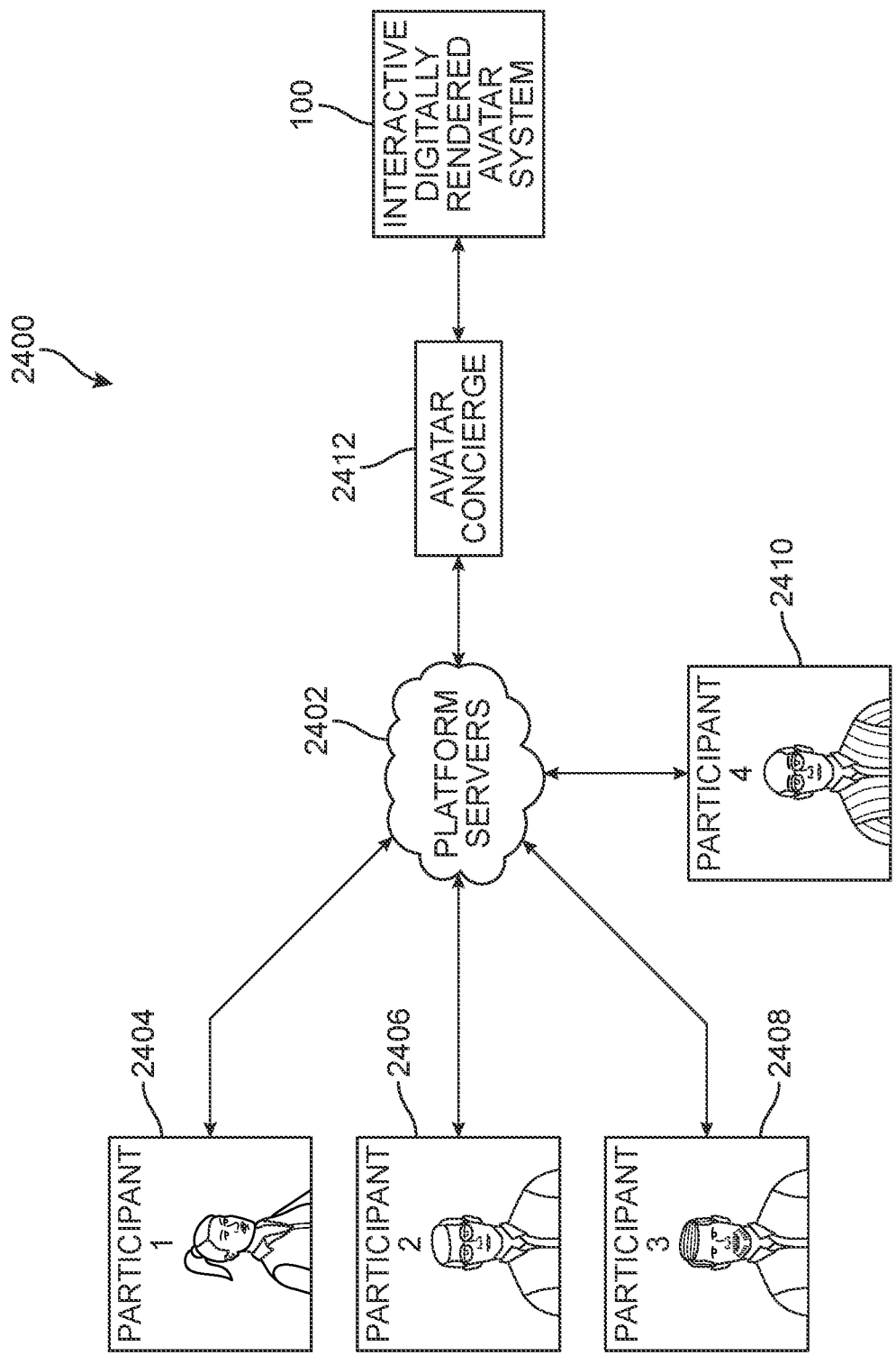
FIG. 24 is a schematic view of an example embodiment of inviting a selected interactive digitally rendered avatar of a subject person to a web meeting.

Referring now to FIGS. 24-29, a representative web meeting with an interactive avatar of a subject person generated according to the techniques described herein is illustrated. FIG. 24 illustrates an example embodiment of an avatar concierge entering a web meeting to assist the participants with recommending or selecting one or more interactive avatars of subject person(s) to invite to the web meeting. In this embodiment, a plurality of participants are engaging (or plan to engage) in a web meeting 2400 through platform servers 2402 of a specific video conferencing platform, for example, first platform 1506, described above. In this scenario, the participants of web meeting 2400 include at least a first participant 2404, a second participant 2406, a third participant 2408, and a fourth participant 2410. It should be understood that a web meeting, such as web meeting 2400, may include any number of participants, include more or less than shown in FIG. 24.

According to the example embodiments, the participants of web meeting 2400 may include an avatar concierge 2412 provided by system 100 in web meeting 2400. As described above, avatar concierge 2412 may review and analyze the topics and subjects being discussed during the web meeting, including topics or subjects currently and/or previously discussed, and make one or more recommendations or selections of interactive avatars of a subject person or persons to invite to the web meeting.

Figure 25:
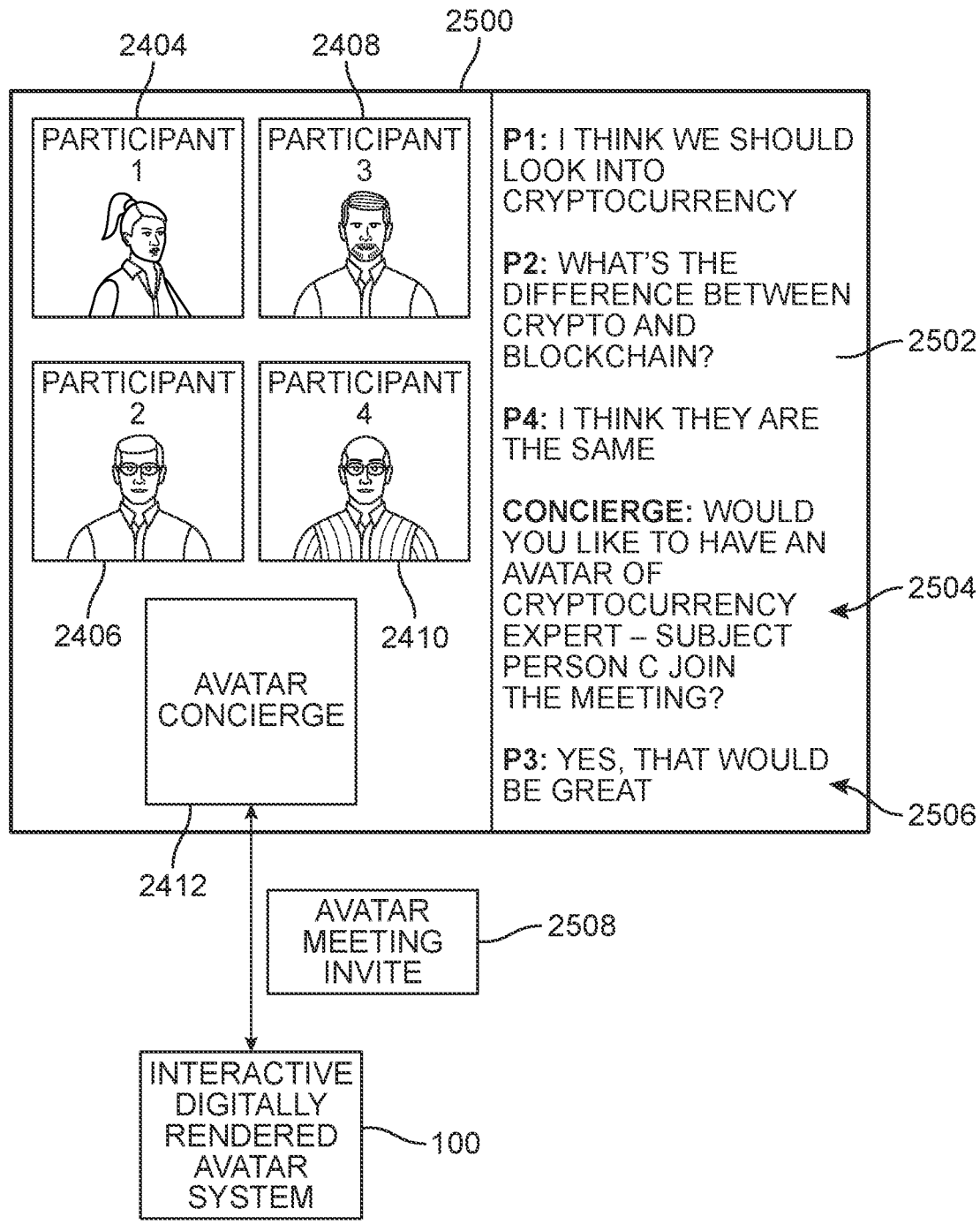
FIG. 25 is a representative view of an example embodiment of a web meeting with an avatar concierge recommending an interactive digitally rendered avatar of a subject person to participate.

Referring now to FIG. 25, a representative view of an example embodiment of an audio/visual chat session of web meeting 2400 including avatar concierge 2412 is shown. In this embodiment, web meeting 2400 may include an audio/visual chat session 2500 that includes audio, video, and/or text from multiple participants, including one or more of first participant 2404, second participant 2406, third participant 2408, and fourth participant 2410, as well as avatar concierge 2412. As shown in FIG. 21, avatar concierge 2412 may review and analyze audio, video, and text of audio/visual chat session 2500 to make a recommendation for an interactive avatar of a subject person to invite to web meeting 2400. In some embodiments, an in-meeting text chat 2502 during audio/visual chat session 2500 may include responses or questions from the various participants (2404, 2406, 2408, 2410) about a variety of different topics and subjects.

In an example embodiment, avatar concierge 2412 may review audio/visual chat session 2500, including text chat 2502, as well as any audio and video, live or prerecorded, and analyze the contents for relevant topics and subject matter. Avatar concierge 2412 may then match the topics and subject matter to keywords or subject matter tags associated with various subject persons with data collections stored in avatar database 116 of system 100 to make one or more recommendations of interactive avatars of subject person(s) to invite to web meeting 2400 to participate in audio/visual chat session 2500 or a new audio/visual chat session.

For example, as shown in FIG. 25, text chat 2502 of audio/visual chat session 2500 includes a discussion by the participants (2404, 2406, 2408, 2410) about cryptocurrency. Based on recognition and analysis of this discussion, avatar concierge 2412 generates a recommendation 2504 of an interactive avatar of a subject person (e.g., subject person C) who is an expert in the topic of cryptocurrency to invite to web meeting 2400 to participate in audio/visual chat session 2500. In response to recommendation 2504 by avatar concierge 2412, one or more participants may approve recommendation 2504, for example, by a response 2506. In some cases, recommendation 2504 may be approved by at least one participant in web meeting 2400. In other cases, a vote or poll may be taken to determine whether or not to approve recommendation 2504. In still other cases, one of the participants may be elected a leader to approve or deny recommendation 2504.

Once recommendation 2504 by avatar concierge 2412 is approved via response 2506, avatar concierge 2412 generates and sends an invite 2508 to system 100 requesting that an interactive avatar of a subject person recommended by avatar concierge 2412 (e.g., subject person C) join web meeting 2400 to participate in audio/visual chat session 2500 or a new audio/visual chat session. System 100 may then render and generate an interactive avatar of the subject person (e.g., subject person C) to join web meeting 2400, as described above. With this arrangement, avatar concierge 2412 may recommend one or more interactive avatars of subject person(s) based on the topics or subjects being discussed.

Figure 26:
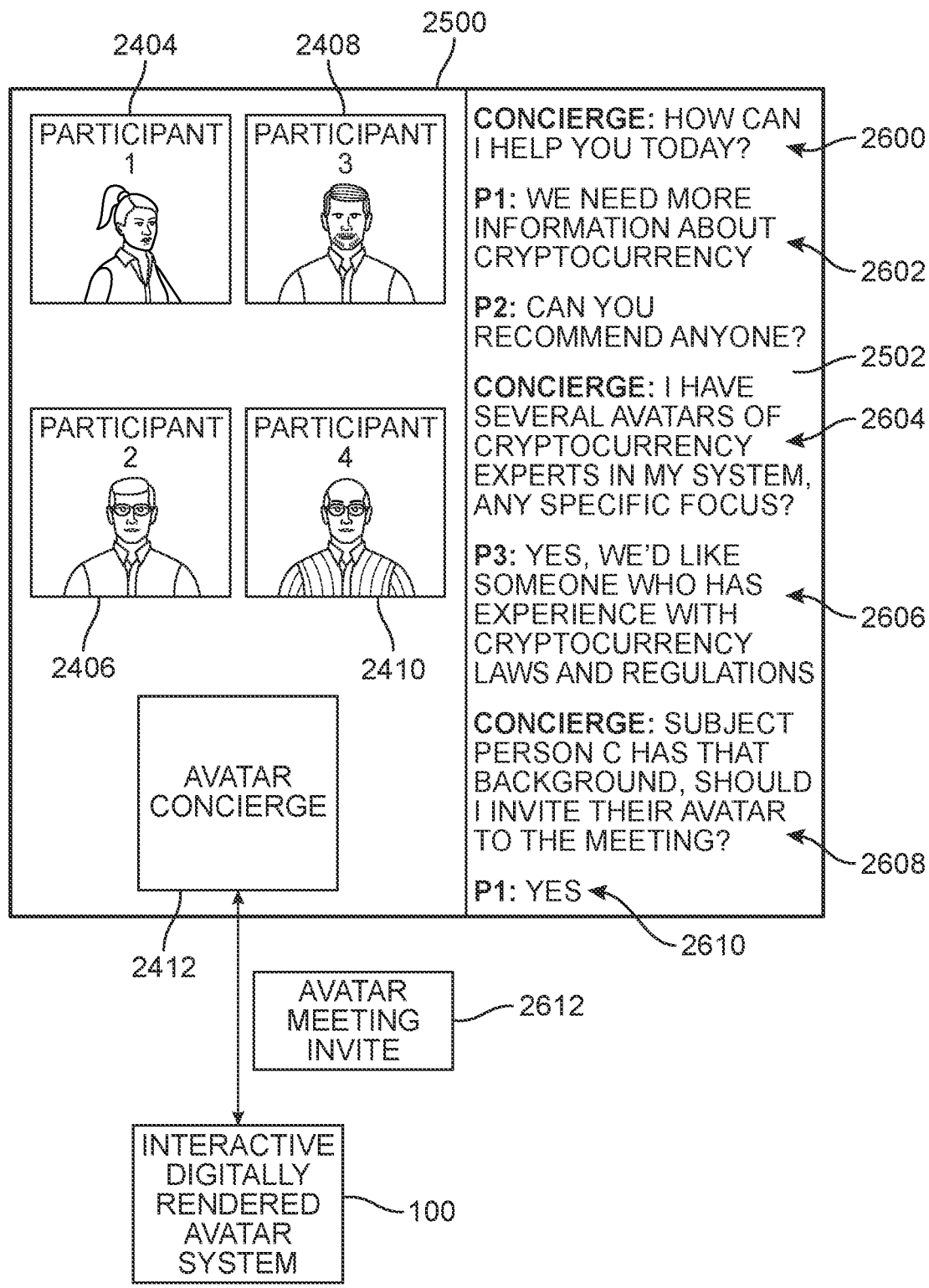
FIG. 26 is a representative view of an example embodiment of a web meeting with an avatar concierge guiding participants to select an interactive digitally rendered avatar of a subject person to participate.

In another embodiment, avatar concierge 2412 may provide a guided selection process to the participants of a web meeting to help them select one or more interactive avatars of subject person(s) to join their web meeting. Referring now to FIG. 26, in an example embodiment, avatar concierge 2412 is included in audio/visual chat session 2500 of web meeting 2400 with first participant 2404, second participant 2406, third participant 2408, and fourth participant 2410. In this embodiment, avatar concierge 2412 asks questions of the various participants (2404, 2406, 2408, 2410) about the topics and subjects that they would like to discuss.

For example, as shown in FIG. 26, text chat 2502 of audio/visual chat session 2500 includes a question 2600 by avatar concierge 2412 to the participants (2404, 2406, 2408, 2410) to being the guided selection process. In this example, first participant 2404 responds to question 2600 with a request 2602 for information about cryptocurrency. Avatar concierge 2412 analyzes the information in request 2602 and notes that several subject persons with expertise or experience in cryptocurrency have interactive avatars stored in avatar database 116 of system 100. In response, avatar concierge 2412 ask participants (2404, 2406, 2408, 2410) a follow up question 2604 to narrow the potential selections of interactive avatars. Third participant 2408 responds to follow up question 2604 with an answer 2606 that includes specific information about cryptocurrency that participants (2404, 2406, 2408, 2410) would like to discuss (e.g., laws and regulations).

In response to answer 2606, avatar concierge 2412 analyzes the specific information in answer 2606 and determines that a subject person C with a matching background or experience to the specific information included in answer 2606 (e.g., laws and regulations regarding cryptocurrency) has an interactive avatar stored in avatar database 116 of system 100. Avatar concierge 2412 generates a recommendation 2608 of an interactive avatar of a subject person (e.g., subject person C) who is an expert in the topic of laws and regulations of cryptocurrency to invite to web meeting 2400 to participate in audio/visual chat session 2500. In response to recommendation 2608 by avatar concierge 2412, one or more participants may approve recommendation 2608, for example, by a response 2610, as described above. Once recommendation 2608 by avatar concierge 2412 is approved via response 2610, avatar concierge 2412 generates and sends an invite 2612 to system 100 requesting that an interactive avatar of a subject person recommended by avatar concierge 2412 (e.g., subject person C) join web meeting 2400 to participate in audio/visual chat session 2500 or a new audio/visual chat session. System 100 may then render and generate an interactive avatar of the subject person (e.g., subject person C) to join web meeting 2400, as described above. With this arrangement, avatar concierge 2412 may provide a guided selection process of one or more interactive avatars of subject person(s) that the participants of a web meeting would like to join their discussion.

Figure 27:
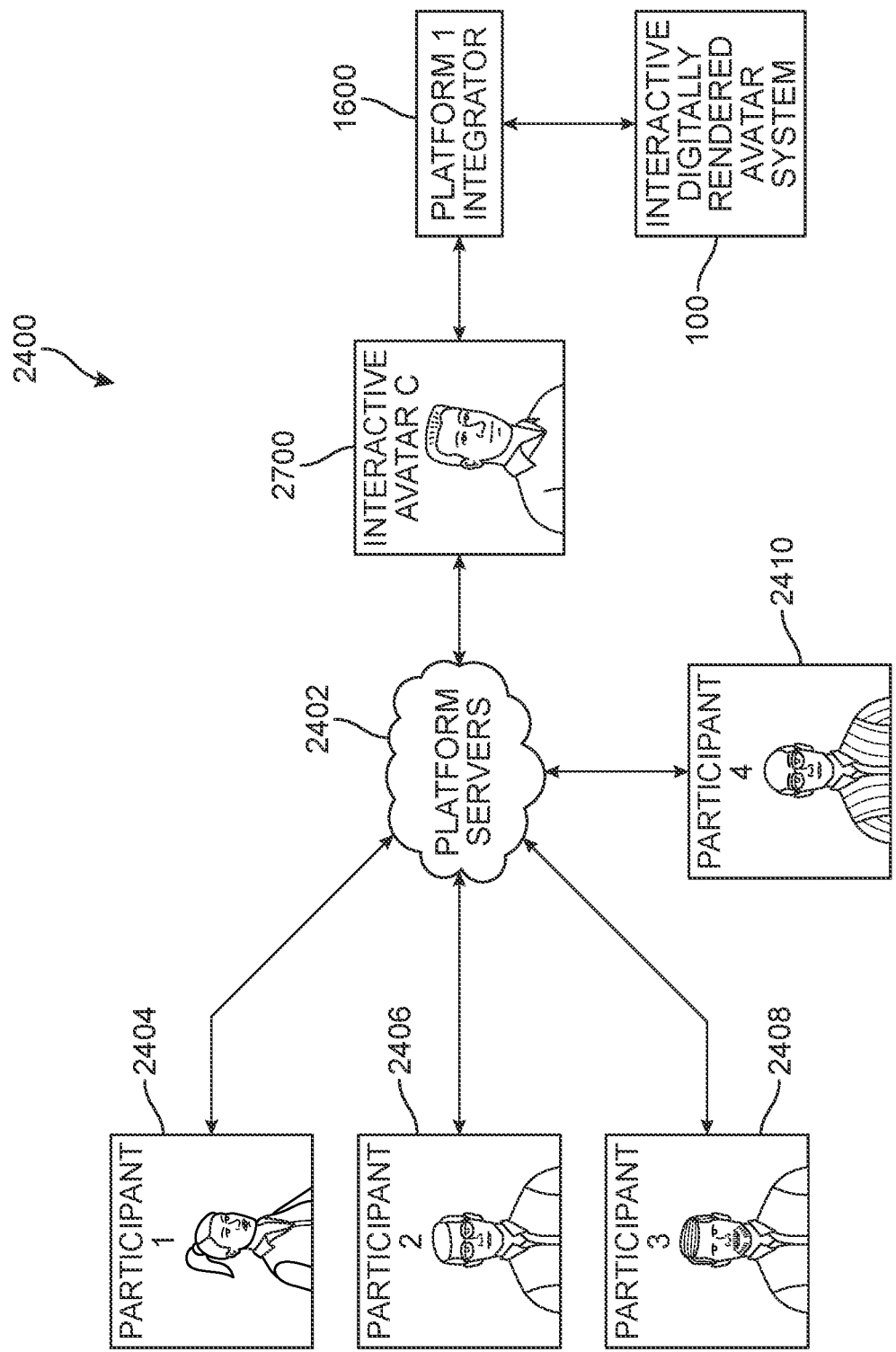
FIG. 27 is a representative view of an example embodiment of a web meeting with an interactive digitally rendered avatar of a subject person participating.

Referring now to FIG. 27, a representative view of an example embodiment of web meeting 2400 with an interactive digitally rendered avatar of a subject person participating based on the recommendation or selection by avatar concierge 2412. In this embodiment, upon receiving a meeting invite for an interactive avatar of a specific subject person (e.g., subject person C), system 100 renders and generates an interactive avatar 2700 of the requested specific subject person. All platforms integrator 1502 of system 100 also instantiates first platform integrator 1600 to transform the outputs and inputs between platform servers 2402 of the video conferencing platform (e.g., first platform 1506, in this example) and system 100 so that interactive avatar 2700 may join web meeting 2400. With this arrangement, interactive avatar 2700 may interact with one or more of first participant 2404, second participant 2406, third participant 2408, and fourth participant 2410 and engage in web meeting 2400 as a participant.

In some cases, once avatar concierge 2412 has made a recommendation or selection of an interactive avatar of a specific person or persons, avatar concierge 2412 may leave web meeting 2400. In other cases, avatar concierge 2412 may remain, for example in the background, in case additional recommendations or selections are requested by the meeting participants. In still other cases, interactive avatar 2700 may invite additional interactive avatars of subject person(s) while participating in web meeting 2400. That is, in some embodiments, functions of avatar concierge 2412 described above may also be provided by one or more interactive avatars, including interactive avatar 2700 in one example.

Figure 28:
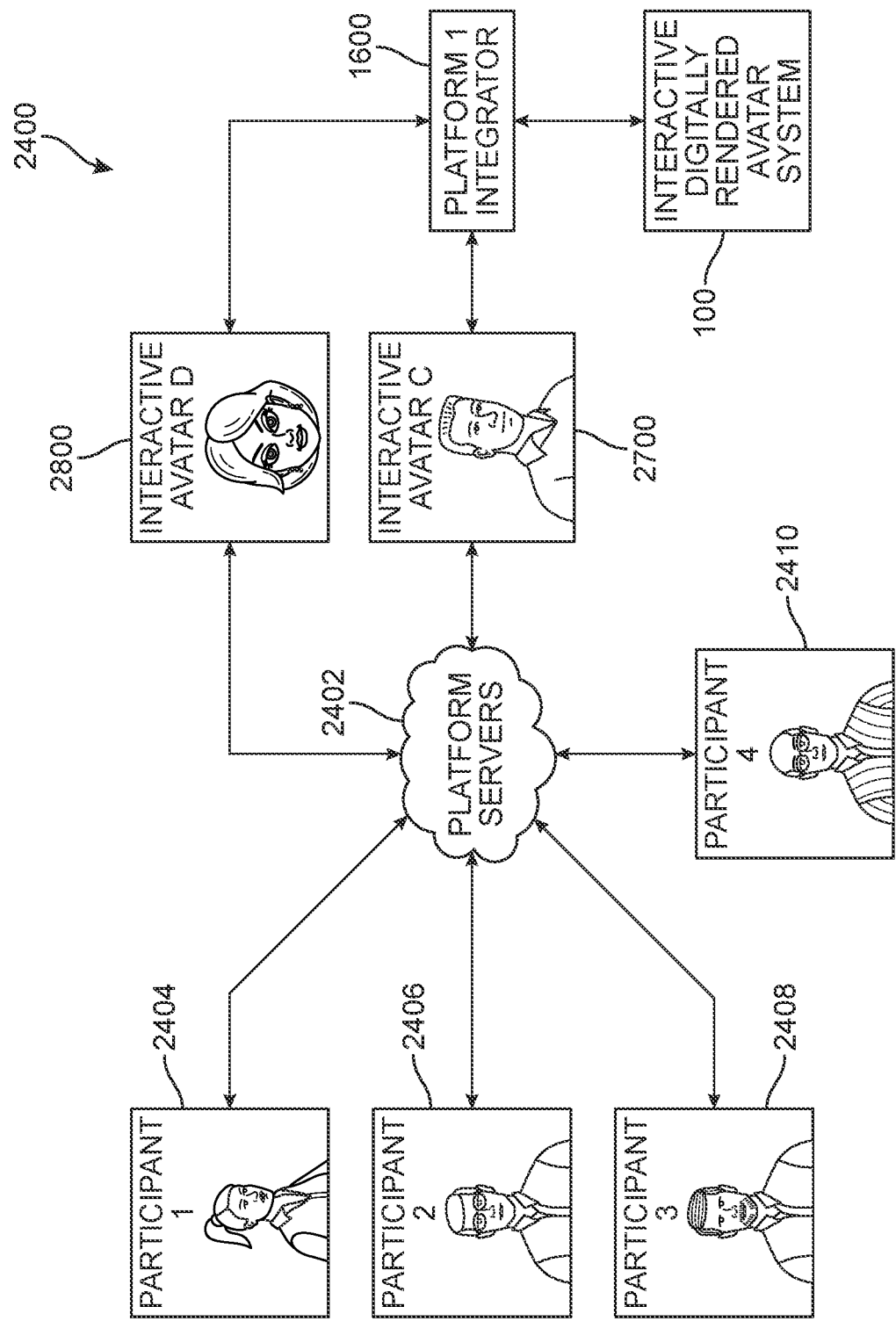
FIG. 28 is a representative view of an example embodiment of an interactive digitally rendered avatar of a subject person in a web meeting inviting another avatar to the web meeting.

FIG. 28 is a representative view of an example embodiment of an interactive digitally rendered avatar of a subject person in a web meeting inviting another avatar to the web meeting. In this embodiment, interactive avatar 2700 is participating in web meeting 2400 with participants (2404, 2406, 2408, 2410) through platform servers 2402 of a specific video conferencing platform, for example, first platform 1506, as described above. During web meeting 2400, the topics or subjects being discussed may switch from cryptocurrency to another topic (e.g., topic D). As shown in FIG. 28, interactive avatar 2700 may recognize this switch or change in topic and determine that the new topic (e.g., topic D) is outside of the information stored in the data collection for the subject person who is a cryptocurrency expert in avatar database 116. In response to this recognition, interactive avatar 2700 may automatically invite an interactive avatar of a new subject person (e.g., subject person D) who is an expert in the new topic (e.g., topic D) to web meeting 2400.

For example, as shown in FIG. 28, interactive avatar 2700 automatically invite an interactive avatar 2800 of subject person D who is an expert or has experience in the new topic or subjects being discussed during web meeting 1400. In an example embodiment, interactive avatar 2700 may use similar techniques as described above with regard to avatar concierge 2412 to recognize and analyze the topics discussed in web meeting 2400 and compare them to keywords or subject matter tags in avatar database 116 to determine that interactive avatar 2800 of subject person D has the expertise or experience to discuss the new topics or subjects. In response, system 100 renders and generates interactive avatar 2800 of subject person D. In this embodiment, first platform integrator 1600 may also transform the outputs and inputs between platform servers 2402 of the video conferencing platform (e.g., first platform 1506, in this example) and system 100 so that interactive avatar 2800 may join and participate in web meeting 2400. With this arrangement, an interactive avatar of a subject person may invite additional interactive avatars to an on-going discussion based on recognition that the topics or subjects being discussed have changed.

Additionally, in some embodiments, an interactive avatar of a subject person may send an invite to the subject person to join the web meeting. For example, the interactive avatar may not have sufficient information to answer a question and may sent a meeting invite directly to the actual subject person to join the web meeting to answer the question or participate in the discussion. In other embodiments, the actual subject person associated with an interactive avatar may monitor one or more ongoing discussions or web meetings that their interactive avatar is participating in and choose to join or request to join into one of those discussions or meetings. For example, the actual subject person may monitor the ongoing discussions or web meetings in a similar manner as described above in reference to FIG. 9.

In some embodiments, an interactive avatar of a subject person participating in an audio/visual chat session of a web meeting may store a copy of a session history, including any audio, video, and text information between the interactive avatar and the one or more participants in the web meeting. For example, in some embodiments, session histories may be stored as part of interaction data 314, described above. The session history stored in interaction data 314 of system 100 may allow any of the participants in the web meeting associated with a particular session to pick up a discussion or conversation with the same interactive avatar of the subject person that participated in the audio/visual chat session of the web meeting. With this arrangement, a participant may jump back into an in-depth or technical discussion without needed to revisit previous or preliminary questions or discussions. This allows participants to continue to build, over multiple sessions (e.g., audio/visual chat sessions, interactive avatar sessions, or a combination of both), a continuing conversation with the same interactive avatar of a specific subject person. That is, the topics and subjects discussed with the interactive avatar carry over into new, subsequent discussions, conducted as part of web meetings, interactive avatar sessions, or combinations of both so that participants may build a relationship with a particular interactive avatar.

Figure 29:
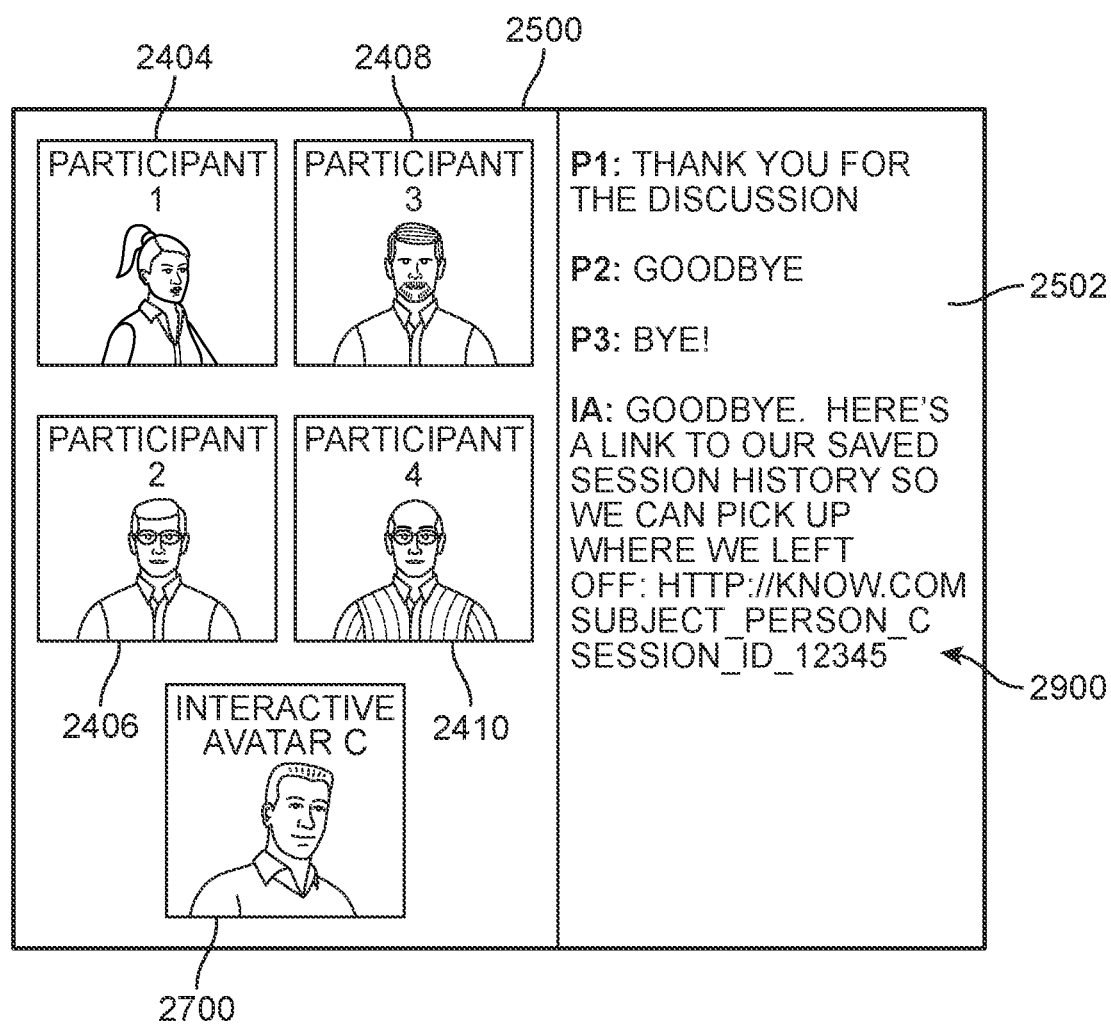
FIG. 29 is a representative view of an example embodiment of an interactive digitally rendered avatar of a subject person providing access to a saved history of the avatar session to participants of the web meeting.

Referring now to FIG. 29, a representative view of an example embodiment of an interactive digitally rendered avatar of a subject person providing access to a saved session history of the audio/visual chat session to participants of the web meeting is shown. In this embodiment, interactive avatar 2700 has been participating in audio/visual chat session 2500 during web meeting 2400 with first participant 2404, second participant 2406, third participant 2408, and fourth participant 2410, as described above. Upon completion of audio/visual chat session 2500 and/or web meeting 2400, interactive avatar 2700 may provide a link 2900 in text chat 2502 of audio/visual chat session 2500 to a session history of the discussion stored in a database of system 100. For example, in some cases, the session history may be stored in interaction data 314, described above. In an example embodiment, link 2900 provided by interactive avatar 2700 may be in the form of a uniform resource locator (URL) or similar reference to the stored location of the session history available at system 100. In an example embodiment, link 2900 includes a unique identifier (e.g., session identifier 12345) that allows system 100 to associate the particular audio/visual chat session 2500, interactive avatar 2700, and participants (2404, 2406, 2408, 2410) with the session history.

Any one or more of participants (2404, 2406, 2408, 2410) may use link 2900 to gain access to the stored session history of audio/visual chat session 2500 interactive avatar 2700 during web meeting 2400 to review the discussion or to initiate a new discussion (e.g., a new audio/visual chat sessions or an interactive avatar session) that may begin where the saved session ended. With this arrangement, a participant may jump back into an in-depth or technical discussion without needed to revisit previous or preliminary questions or discussions. This allows participants to continue to build, over multiple sessions (e.g., audio/visual chat sessions, interactive avatar sessions, or a combination of both), a continuing conversation with the same interactive avatar of a specific subject person.

Additionally, each participant (e.g. first participant 2404, second participant 2406, third participant 2408, and/or fourth participant 2410) may independently access the stored session history via link 2900 to start an individual interactive session with the interactive avatar without the other participants. Each individual interactive session may start from the same stored session history, but may veer into different topics or subjects selected by each individual participant. In some cases, participants attempting to access the stored session history via link 2900 may need to register with system 100 as users in order to engage in a new interactive session or audio/visual chat session with the same interactive avatar.

While various embodiments of the disclosure have been described, the description is intended to be exemplary, rather than limiting and it will be apparent to those of ordinary skill in the art that many more embodiments and implementations are possible that are within the scope of the disclosure. Accordingly, the disclosure is not to be restricted except in light of the attached claims and their equivalents. Also, various modifications and changes may be made within the scope of the attached claims.

The invention claimed is:

1. A method of recommending an interactive digital avatar of a subject person to participate in a web meeting on a video conferencing platform, the method comprising:
  joining, by an avatar concierge of an interactive digitally rendered avatar system, a web meeting on a video conferencing platform with a plurality of participants;
  analyzing, by the avatar concierge, one or more topics or subjects discussed by the plurality of participants during the web meeting;
  based on the analysis of the one or more topics or subjects discussed by the plurality of participants during the web meeting, recommending, by the avatar concierge, at least one interactive avatar of a subject person, wherein the subject person has expertise or experience with the one or more topics or subjects discussed by the plurality of participants during the web meeting and wherein a data collection associated with the subject person is stored in a database at the interactive digitally rendered avatar system;
  sending an invite, by the avatar concierge, requesting that the at least one interactive avatar of the subject person join the web meeting;
  generating, by the interactive digitally rendered avatar system, the at least one interactive avatar of the subject person, wherein the at least one interactive avatar is generated based on the data collection associated with the subject person stored in the database at the interactive digitally rendered avatar system;
  wherein an artificial intelligence engine associated with the interactive digitally rendered avatar system provides instructions to control the interactive avatar of the subject person to participate in the web meeting, and
  wherein the artificial intelligence engine uses the data collection associated with the subject person stored in the database to generate one or more responses from the interactive avatar of the subject person to participants of the web meeting about the one or more topics or subjects discussed by the plurality of participants without input from the subject person during the web meeting.

2. The method according to claim 1, further comprising:
  instantiating, by the interactive digitally rendered avatar system, a platform integrator associated with the video conferencing platform identified in the invite; and
  joining, by the interactive avatar of the subject person, the web meeting on the video conferencing platform, wherein the platform integrator is configured to transform outputs and inputs between the video conferencing platform and the interactive digitally rendered avatar system so that the interactive avatar of the subject person participates in the web meeting.

3. The method according to claim 1, wherein the avatar concierge reviews audio, video, and/or text from the web meeting with the plurality of participants to analyze the one or more topics or subjects discussed during the web meeting.

4. The method according to claim 1, wherein the avatar concierge compares the one or more topics or subjects discussed during the web meeting to one or more keywords or subject matter tags associated with data collections of a plurality of subject persons stored in the database.

5. The method according to claim 1, wherein the avatar concierge performs a guided selection process including one or more questions to the plurality of participants to determine the one or more topics or subjects.

6. The method according to claim 2, wherein the platform integrator transforms the outputs and the inputs between the video conferencing platform and the interactive digitally rendered avatar system to correspond with a set of protocols and requirements for the video conferencing platform.

7. The method according to claim 1, further comprising:
  upon completion of the web meeting, providing a link to a session history stored in a database at the interactive digitally rendered avatar system.

8. The method according to claim 7, wherein each participant of the plurality of participants may continue a discussion with the interactive avatar of the subject person by accessing the link to the session history.

9. The method according to claim 1, further comprising:
determining, during the web meeting, a change in a topic being discussed; and
in response, automatically inviting an interactive avatar of a new subject person to the web meeting.

10. The method according to claim 9, wherein the new subject person is associated with a data collection stored in the database at the interactive digitally rendered avatar system that includes at least one keyword or subject matter tag that matches the topic being discussed.

11. The method according to claim 1, further comprising:
determining, by the interactive avatar of the subject person, that information to answer a question from at least one participant of the plurality of participants is not available in the data collection associated with the subject person stored in the database at the interactive digitally rendered avatar system; and
in response, sending an invite to the subject person to join the web meeting.

12. The method according to claim 1, wherein the avatar concierge remains in the web meeting after the interactive avatar of the subject person has joined the web meeting.

13. The method according to claim 1, wherein the avatar concierge leaves the web meeting after the interactive avatar of the subject person has joined the web meeting.

* * * * *